United States Patent
Fujii et al.

(10) Patent No.: US 8,028,330 B2
(45) Date of Patent: Sep. 27, 2011

(54) SYSTEM, APPARATUS, AND PROGRAM FOR BIOMETRIC AUTHENTICATION

(75) Inventors: Yoshihiro Fujii, Fuchu (JP); Minoru Nishizawa, Fuchu (JP); Tatsuro Ikeda, Fuchu (JP); Koji Okada, Tokyo (JP); Tomoaki Morijiri, Chofu (JP); Hidehisa Takamizawa, Fuchu (JP); Asahiko Yamada, Tokorozawa (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 938 days.

(21) Appl. No.: 11/968,710

(22) Filed: Jan. 3, 2008

(65) Prior Publication Data

US 2008/0172725 A1    Jul. 17, 2008

(30) Foreign Application Priority Data

Jan. 16, 2007  (JP) ................................. 2007-007309

(51) Int. Cl.
*H04L 9/32* (2006.01)
*H04L 9/00* (2006.01)
*G06F 17/30* (2006.01)

(52) U.S. Cl. ............. 726/5; 726/3; 726/4; 726/6; 726/7; 713/168; 713/169; 713/170; 713/171; 713/172

(58) Field of Classification Search ........................ 726/5
See application file for complete search history.

(56) References Cited

U.S. PATENT DOCUMENTS

2006/0228005 A1*  10/2006  Matsugu et al. .............. 382/116

FOREIGN PATENT DOCUMENTS

| CN | 1499365 A | 5/2004 |
| CN | 1845126 A | 10/2006 |
| EP | 1 418 485 A2 | 5/2004 |
| JP | 2006-11768 | 1/2006 |

OTHER PUBLICATIONS

Notification of First Office Action issued by the Chinese Patent Office on Apr. 28, 2010 in Chinese Application No. 200710169173.6 (4 pages) and English Translation of Office Action (6 pages total).

* cited by examiner

*Primary Examiner* — Longbit Chai
(74) *Attorney, Agent, or Firm* — Finnegan, Henderson, Farabow, Garrett & Dunner, L.L.P.

(57) ABSTRACT

A client apparatus transmits environmental information acquired from an environmental information acquisition device as well as a biometric authentication information matching result to a server apparatus. The server apparatus verifies the validity of the environmental information such as a luminance as well as the validity of the biometric authentication information matching result. If an environment is problematic, the server apparatus notifies the client apparatus that the environmental information is problematic. The client apparatus overcomes the problem of the environment such as the luminance based on the notification from the server apparatus and then retries a biometric authentication. The possibility of re-failure due to the environmental problem can be reduced during a retry of the biometric authentication.

3 Claims, 34 Drawing Sheets

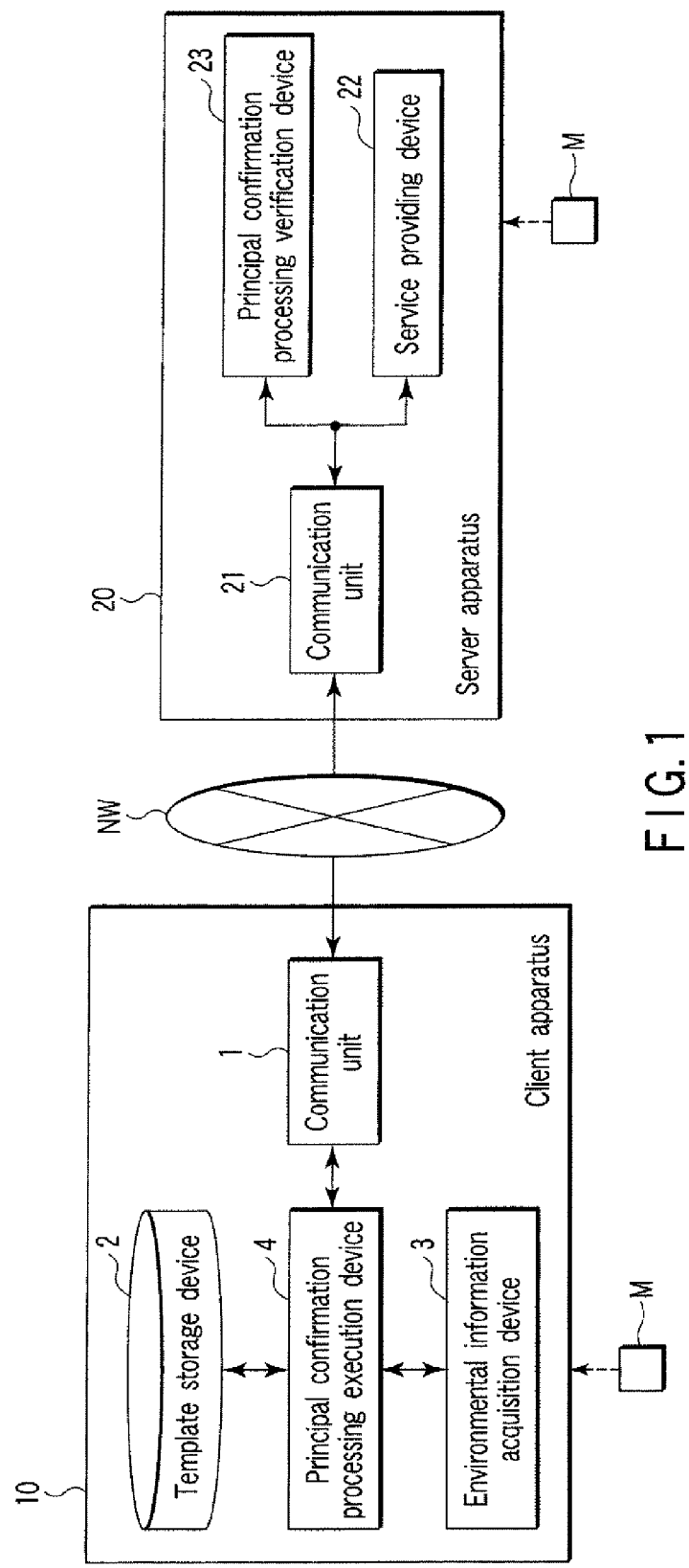
F I G. 1

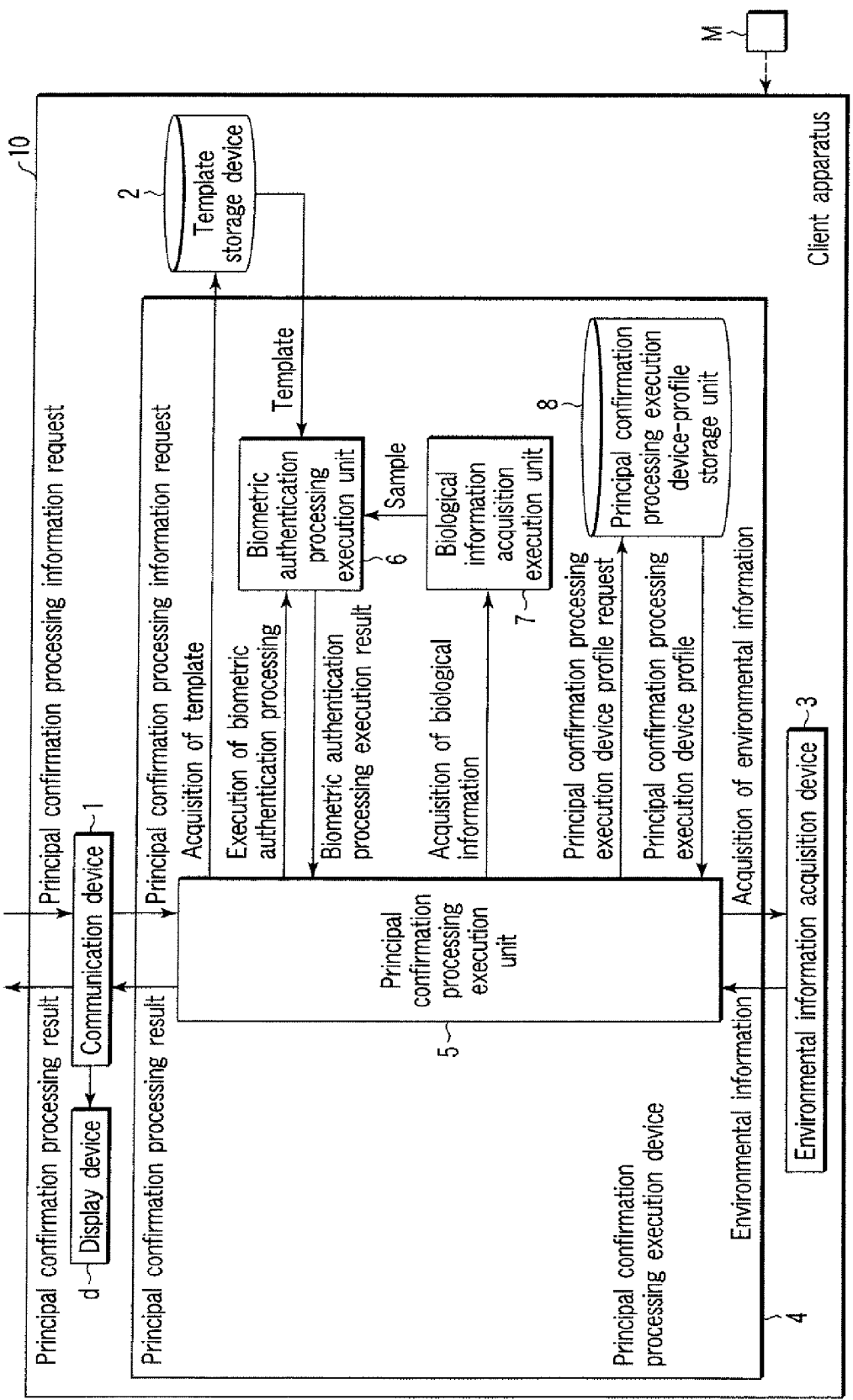
F I G. 2

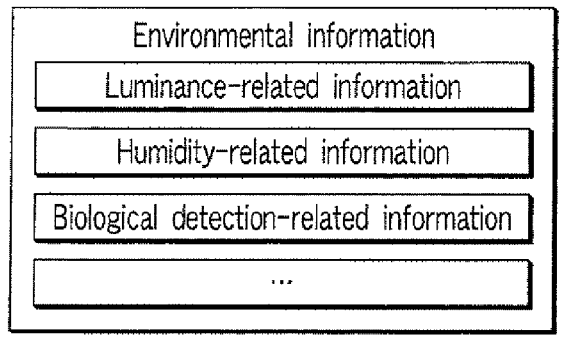

FIG. 3

| Principal confirmation processing result |  |
|---|---|
| Biometric authentication processing execution result | |
| Biological matching information | Content |
| Challenge data | 123456789 |
| Matching result | OK |
| Matching accuracy | 90 points |
| Matching method | Fingerprint authentication |
| Matching algorithm | Algorithm A1 |
| False rejection rate | 0.1% |
| False acceptance rate | 0.001% |
| Retry count | 0 |
| Template certificate | Present |
| Device certificate | NA |
| Algorithm certificate | NA |
| ... | ... |

| Environmental information | |
|---|---|
| Luminance-related information | |
| Humidity-related information | |
| Biological detection-related information | |
| ... | ... |

FIG. 4

| Biometric authentication processing execution result | |
|---|---|
| Biological matching information | Content |
| Challenge data | 123456789 |
| Matching result | OK |
| Matching accuracy | 90 points |
| Matching method | Fingerprint authentication |
| Matching algorithm | Algorithm A1 |
| False rejection rate | 0.1% |
| False acceptance rate | 0.001% |
| Retry count | 0 |
| Template certificate | Present |
| Device certificate | NA |
| Algorithm certificate | NA |
| ... | ... |

FIG. 5

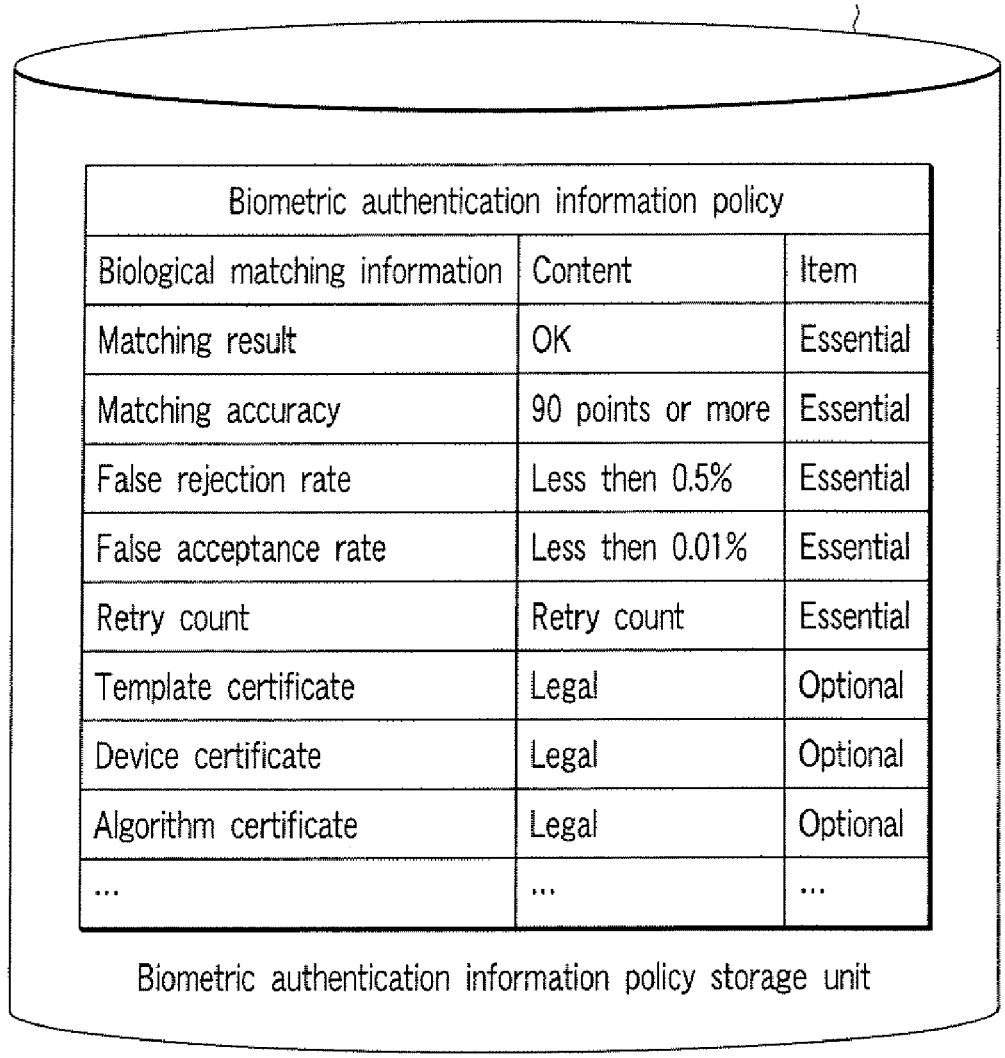

| Biometric authentication information policy | | |
|---|---|---|
| Biological matching information | Content | Item |
| Matching result | OK | Essential |
| Matching accuracy | 90 points or more | Essential |
| False rejection rate | Less then 0.5% | Essential |
| False acceptance rate | Less then 0.01% | Essential |
| Retry count | Retry count | Essential |
| Template certificate | Legal | Optional |
| Device certificate | Legal | Optional |
| Algorithm certificate | Legal | Optional |
| ... | ... | ... |

Biometric authentication information policy storage unit

FIG. 8

| Principal confirmation result | Principal confirmation information verification result | Matching accuracy | Account lock/retry operation |
|---|---|---|---|
| OK | Environmental information is within range of statistic data | | — |
| | Environmental information is out of range of statistic data | | — |
| | Matching accuracy is low | | Encourage retry |
| | Biological detection information is not present | | Encourage retry |
| | Template certificate is illegal | | Execute level [HIGH] account lock |
| | ... | ... | ... |
| NG | Environmental information is within range of statistic data | 60 points or more | Encourage retry without creating improvement message |
| | | 60 points or less | Execute level [LOW] account lock |
| | Environmental information is out of range of statistic data | | Execute level [LOW] account lock |
| | Environmental information is out of range of statistic data and retry count is three or more | | Create improvement message and encourage retry |
| | Biological detection information is not present | | Execute level [LOW] account lock |
| | Environmental information is out of range of statistic data and retry count is three or more | | Execute level [MEDIUM] account lock |
| | Template certificate is illegal | | Execute level [HIGH] account lock |
| | ... | ... | ... |

Retry policy storage unit 30

F I G. 10

| Principal confirmation result | Principal confirmation information verification result | Improvement message |
|---|---|---|
| OK | Environmental information is out of range of statistic data | Adjust environment having abnormality and encourage making matching again |
| | Biological information is not present | Encourage making matching again because biological detection cannot be made |
| | ... | ... |
| NG | Environmental information is within range of statistic data | Encourage making matching again |
| | Environmental information is out of range of statistic data | Adjust environment having abnormality and encourage making matching again |
| | ... | ... |

F I G. 11

| Principal confirmation information verification result (first example) | |
|---|---|
| Principal confirmation result | OK |
| Matching accuracy | 95 points |
| Matching method | Fingerprint authentication |
| Matching algorithm | Algorithm A1 |
| False rejection rate | OK |
| False acceptance rate | OK |
| Retry count | 0 |
| Template certificate | OK |
| Device certificate | — |
| Algorithm certificate | — |
| Luminance | OK |
| Humidity | OK |
| Biological detection | OK |
| ... | ... |

FIG. 15A

| Principal confirmation information verification result (second example) | |
|---|---|
| Principal confirmation result | NG |
| Matching accuracy | 75 points |
| Matching method | Face authentication |
| Matching algorithm | Algorithm B1 |
| False rejection rate | OK |
| False acceptance rate | OK |
| Retry count | 0 |
| Template certificate | OK |
| Device certificate | — |
| Algorithm certificate | — |
| Luminance | NG |
| Humidity | OK |
| Biological detection | OK |
| ... | ... |

FIG. 15B

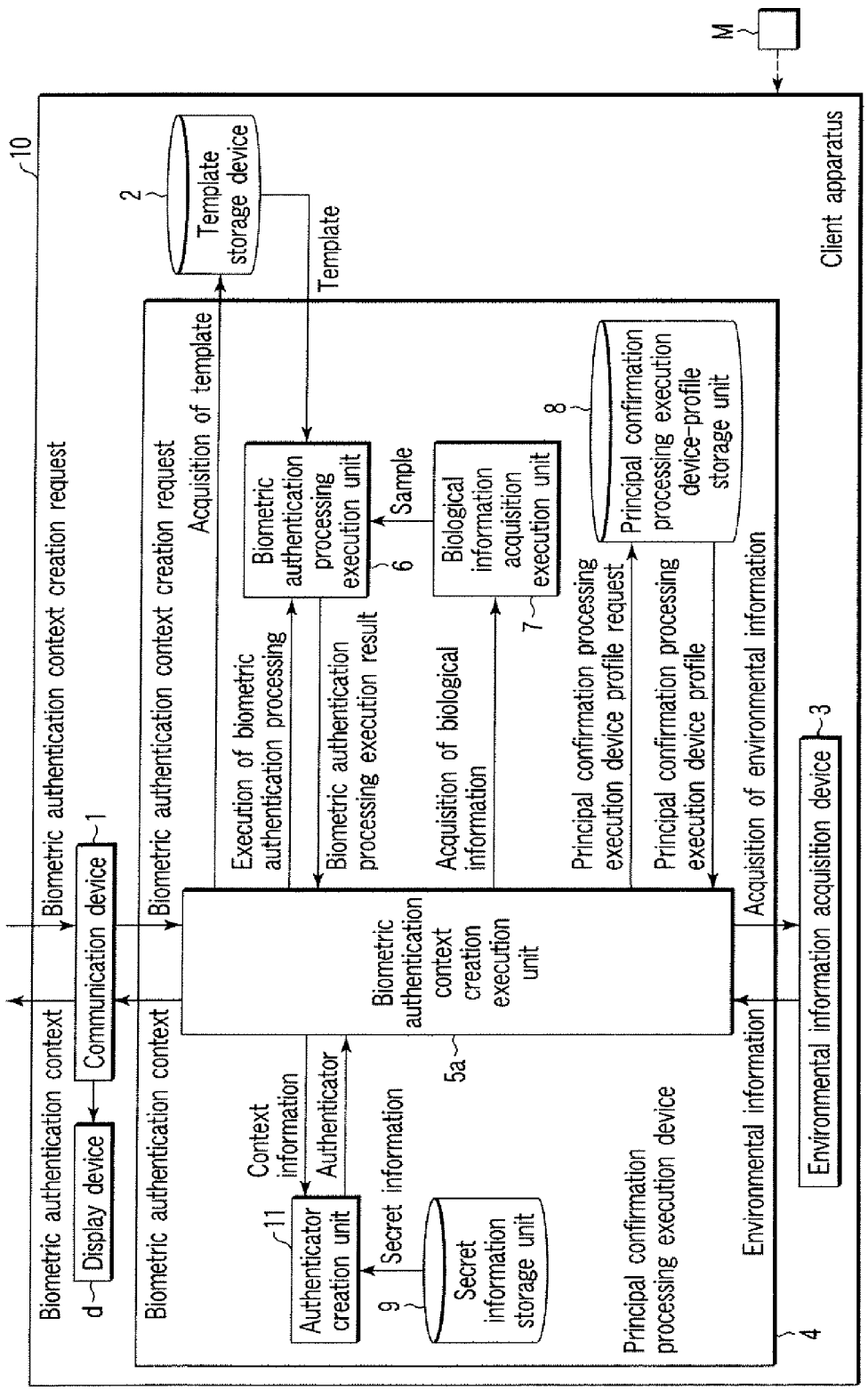
F I G. 16

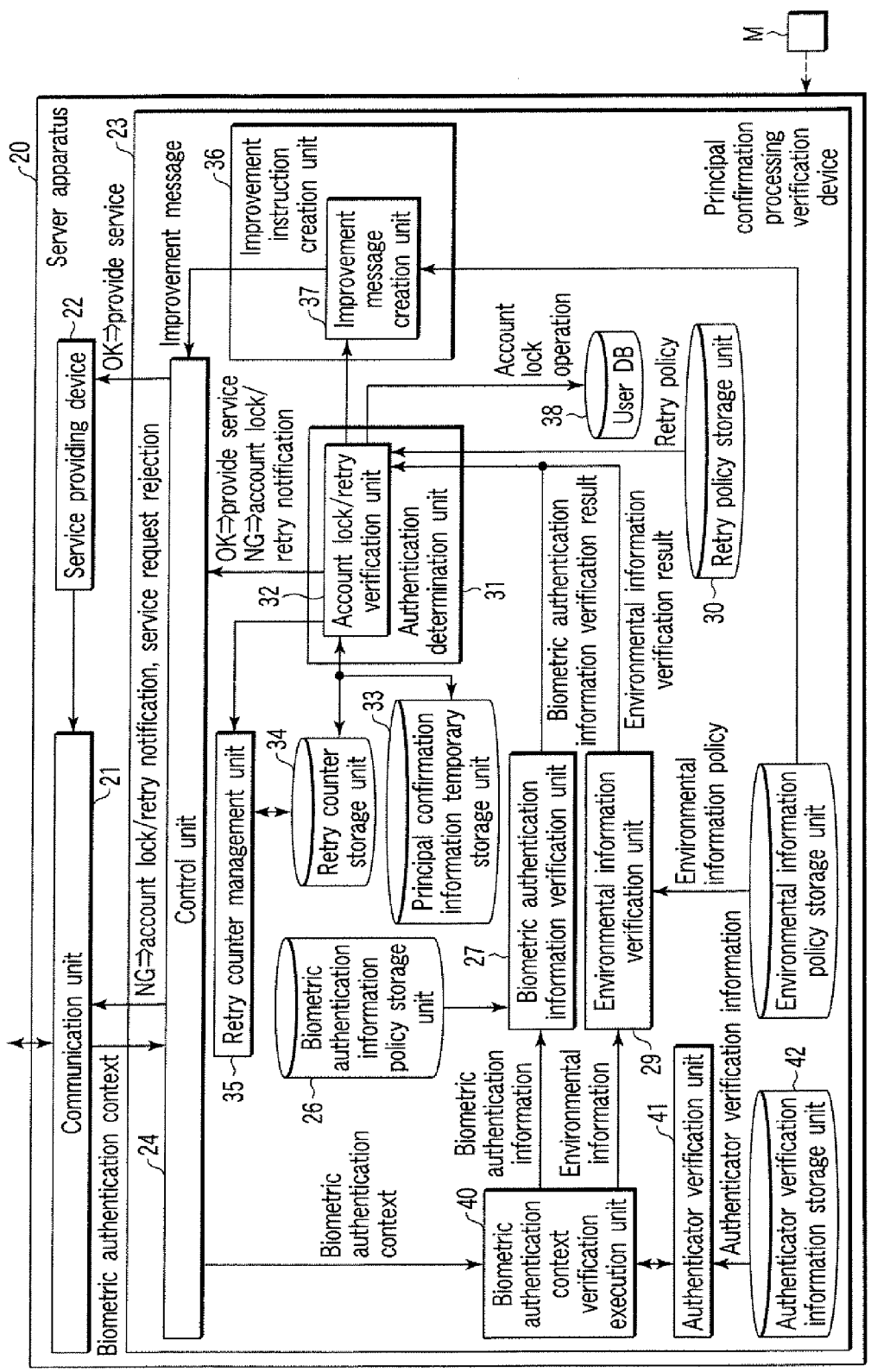
F I G. 17

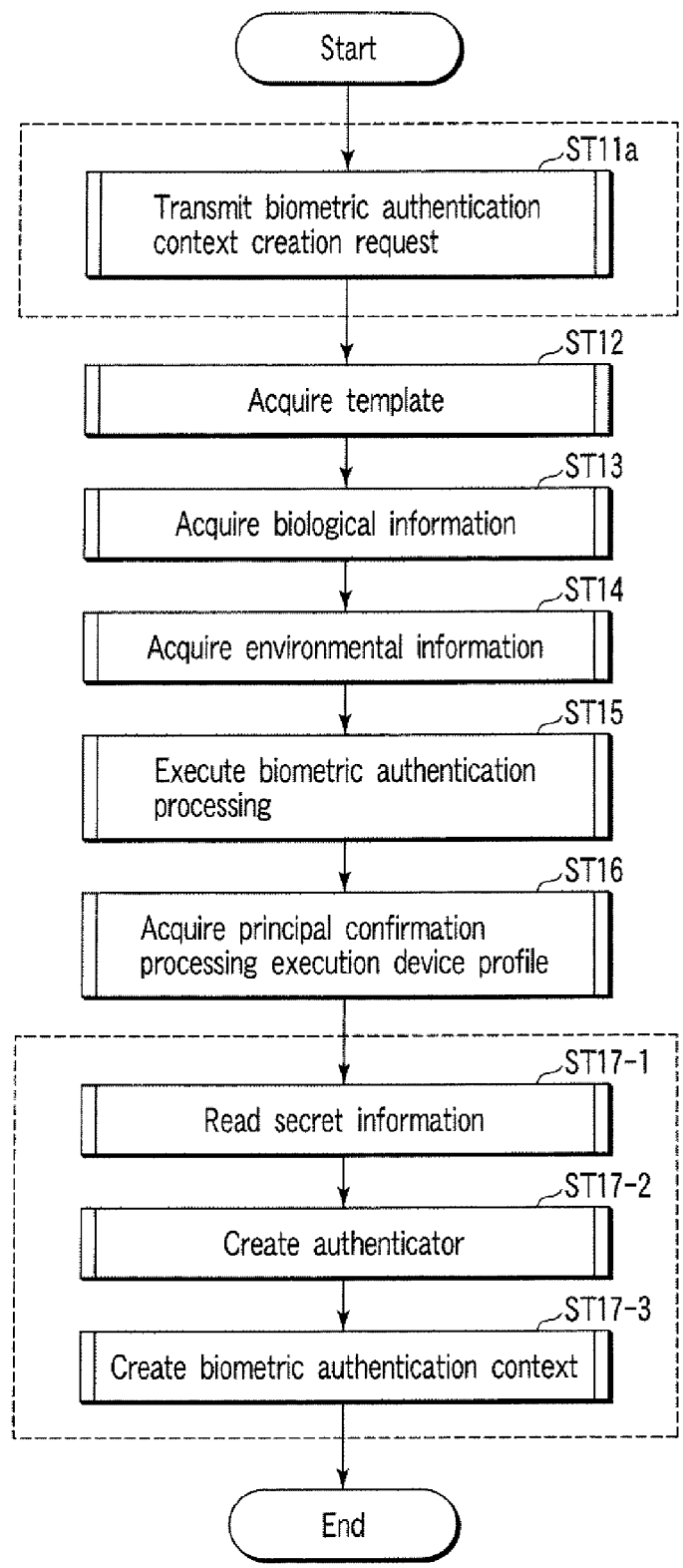
F I G. 18

| Principal confirmation result | Account lock/retry policy | |
|---|---|---|
| | Principal confirmation information verification result | Account lock/retry operation |
| OK | Environmental information is within range of statistic data | — |
| | Environmental information is out of range of statistic data | — |
| | Matching accuracy is low | Encourage retry |
| | Biological detection information is not present | Encourage retry |
| | Template certificate is illegal | Execute level [HIGH] account lock |
| | Authentication context is illegal | Execute level [HIGH] account lock |
| | ... | ... |
| NG | Environmental information is within range of statistic data | Encourage retry without creating improvement message |
| | Environmental information is out of range of statistic data | Create improvement message and encourage retry |
| | Environmental information is out of range of statistic data (without reflection of improvement message) | Execute level [LOW] account lock |
| | Biological detection information is not present | Execute level [MEDIUM] account lock |
| | Principal confirmation information is illegal | Execute level [HIGH] account lock |
| | Authentication context is illegal | Execute level [HIGH] account lock |
| | ... | ... |

Retry policy storage unit 30

F I G. 20

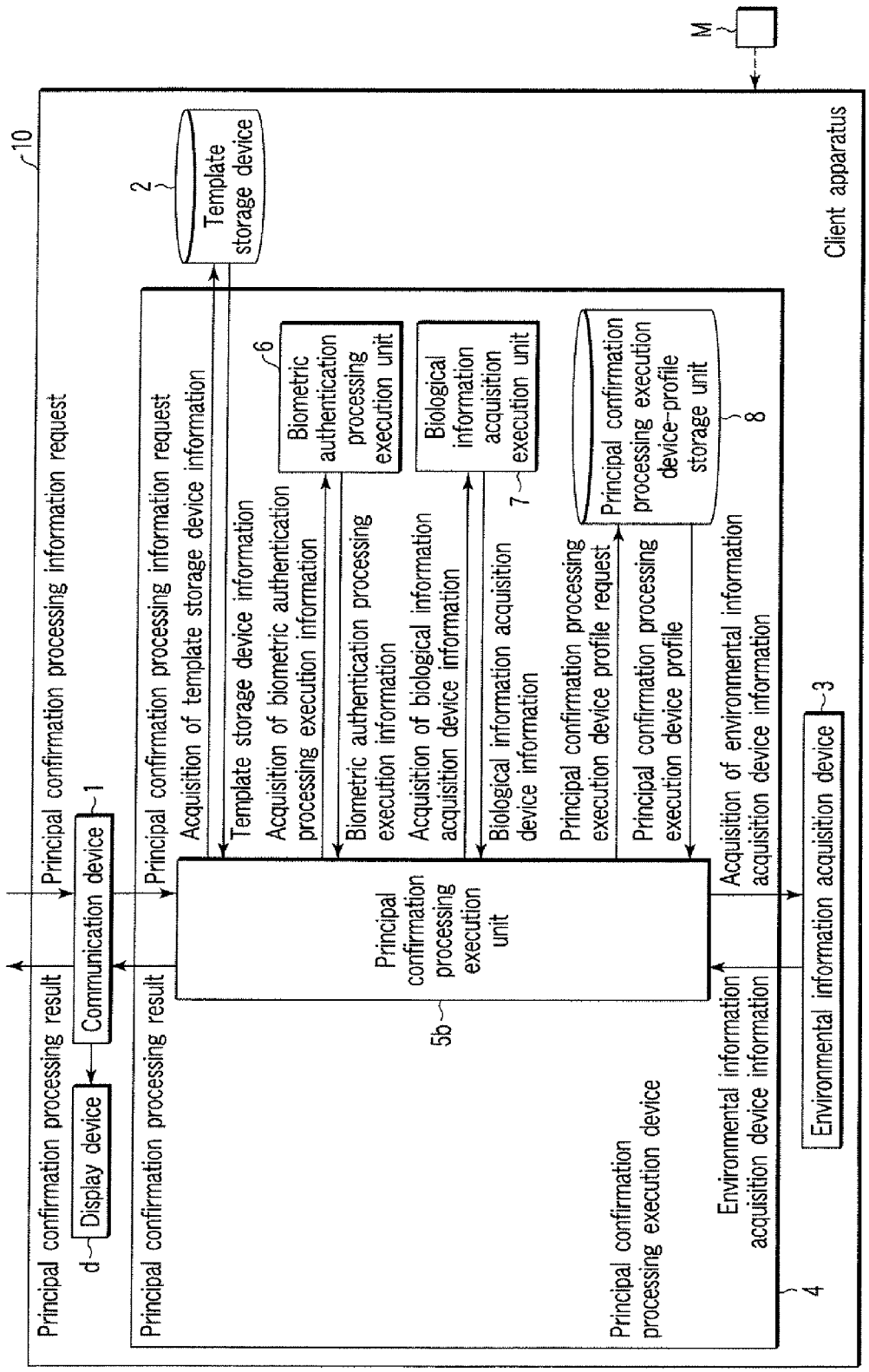
F I G. 21

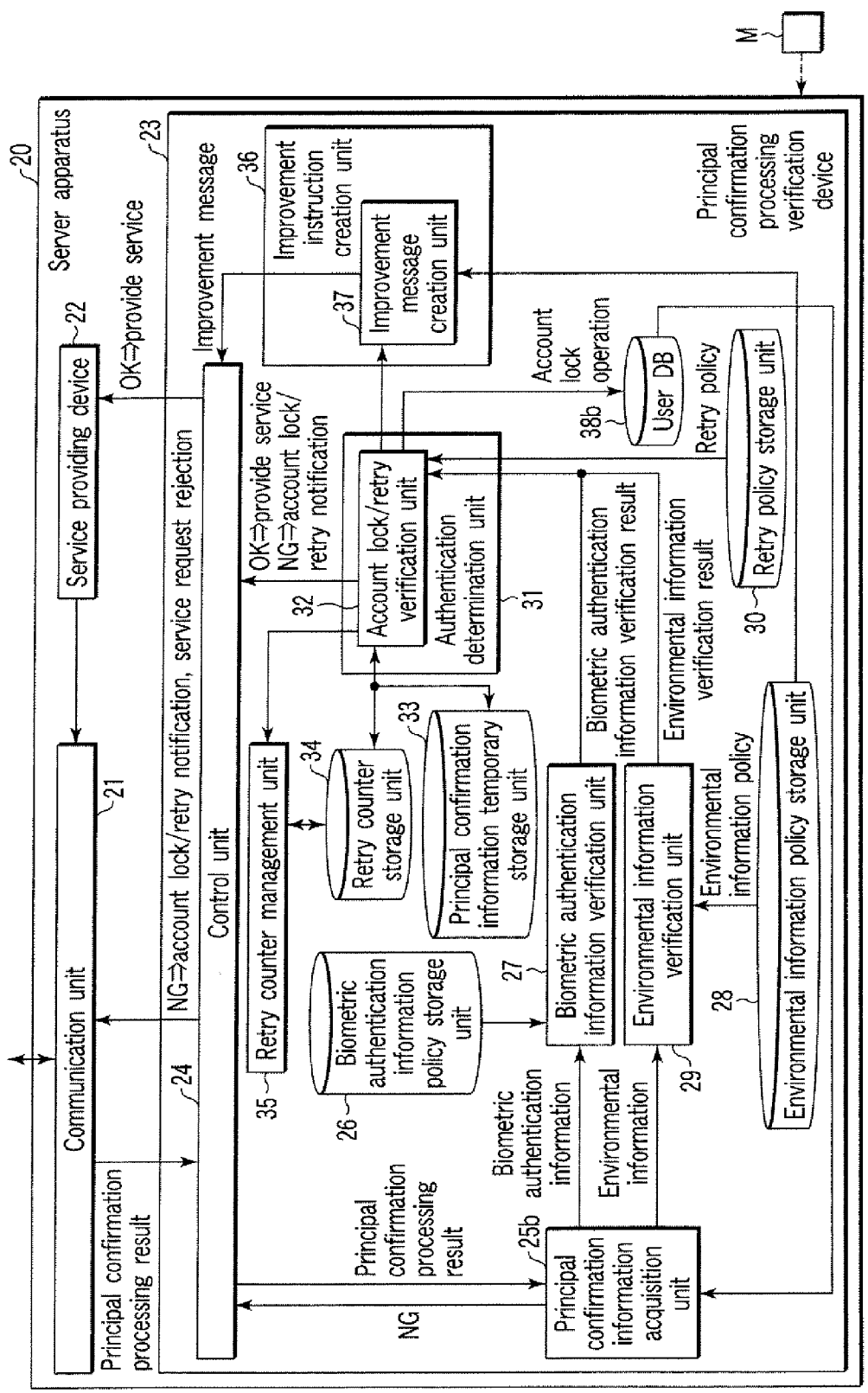
F I G. 22

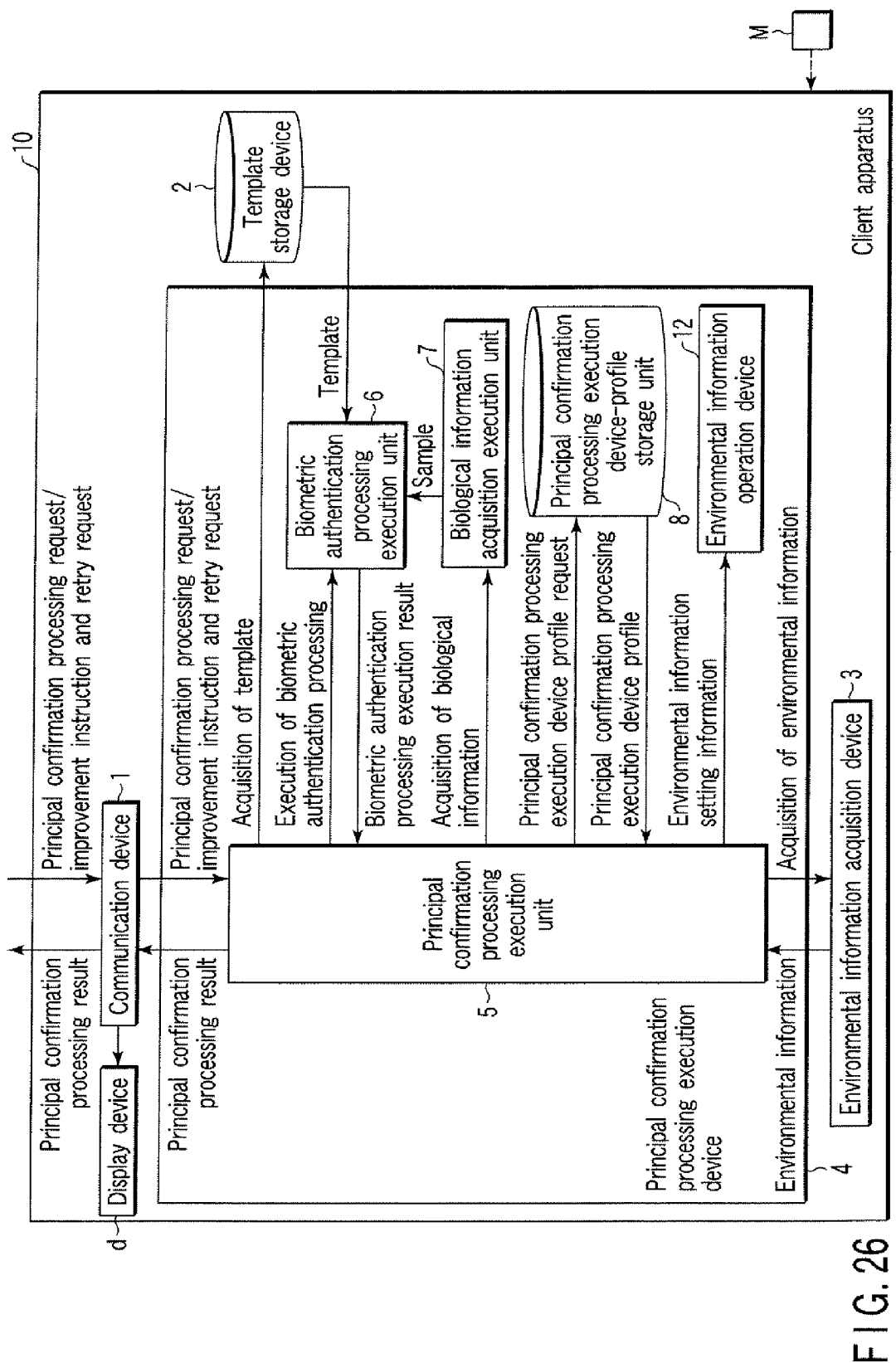
F I G. 26

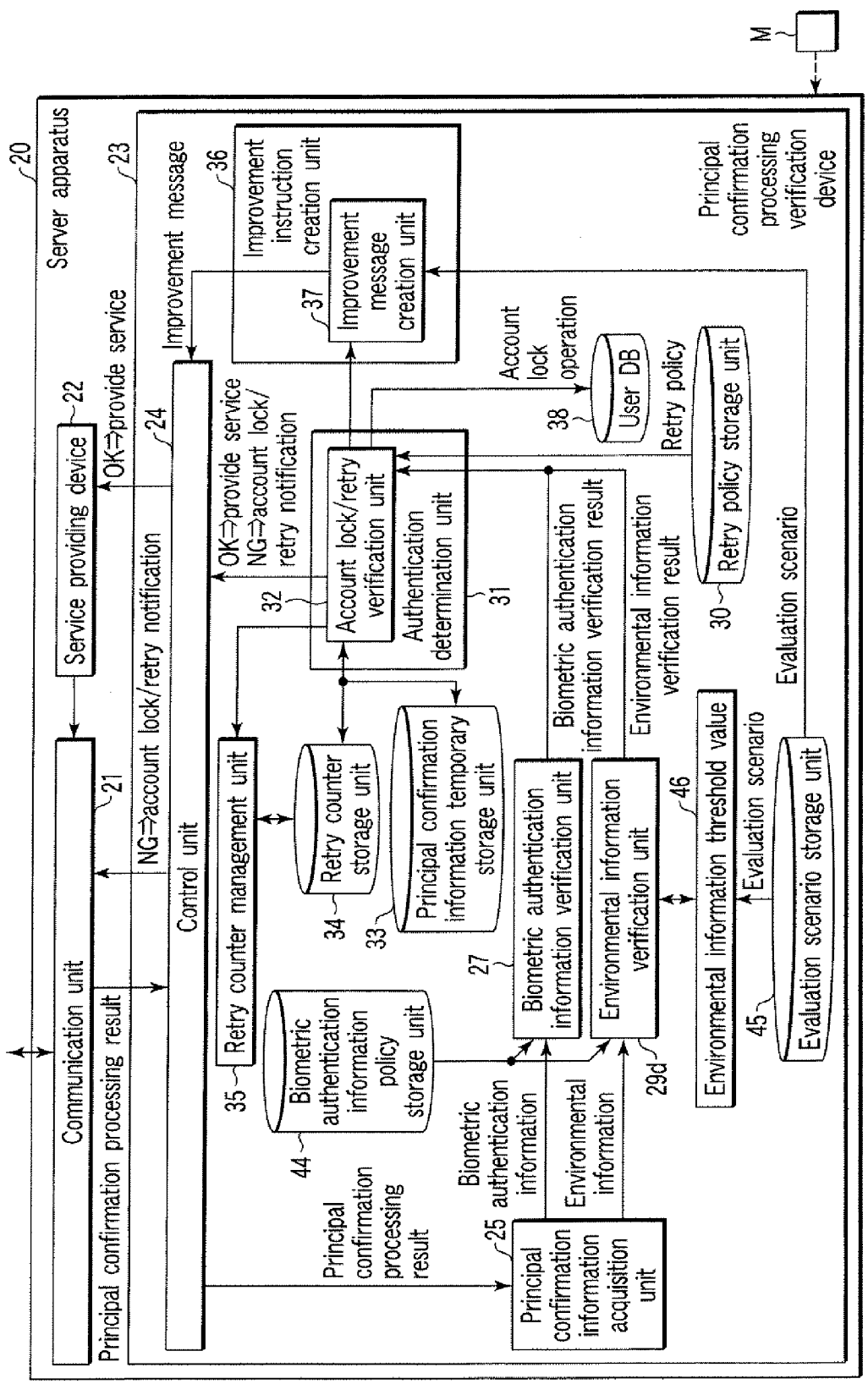
F I G. 29

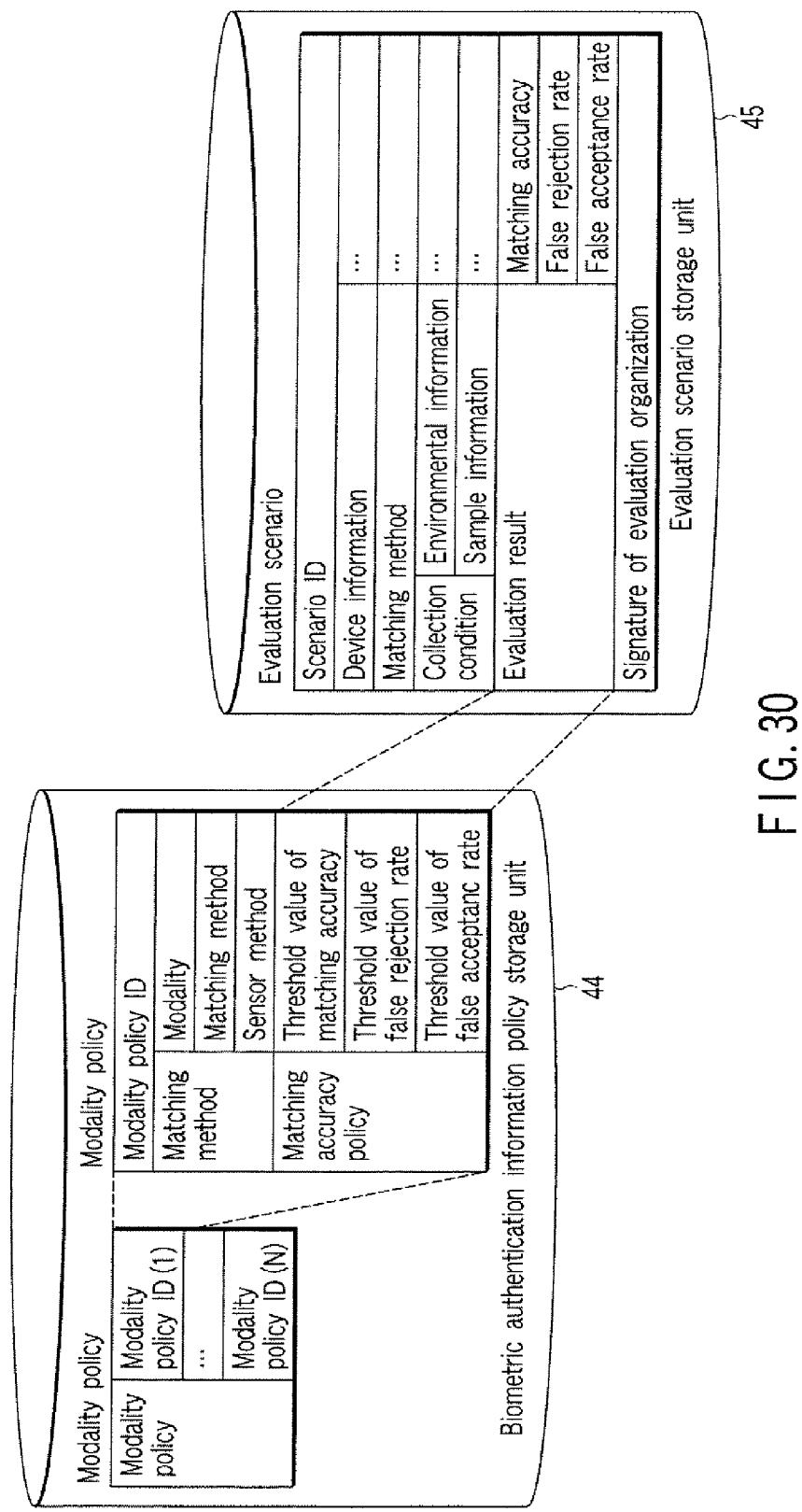
F I G. 30

FIG. 31

| Header part | Scenario ID | |
|---|---|---|
| | Matching device information | Manufacturer name |
| | | Model name |
| | | Device number |
| | Matching method | Modality |
| | | Matching algorithm |
| | | Sensor method |
| Data part | Collection condition | Environmental information | Number of environments |
| | | | Type of environmental information (1) |
| | | | Measured value of environmental information (1) |
| | | | ... |
| | | | Type of environmental information (N) |
| | | | Measured value of environmental information (N) |
| | | Sample information | Number of samples |
| | | | Male-female ratio |
| | | | Age ratio |
| | | | Number of pieces of effective biological information |
| | Evaluation result | Matching accuracy |
| | | False rejection rate |
| | | False acceptance rate |
| | Signature of evaluation organization | |

Evaluation scenario storage unit — 45

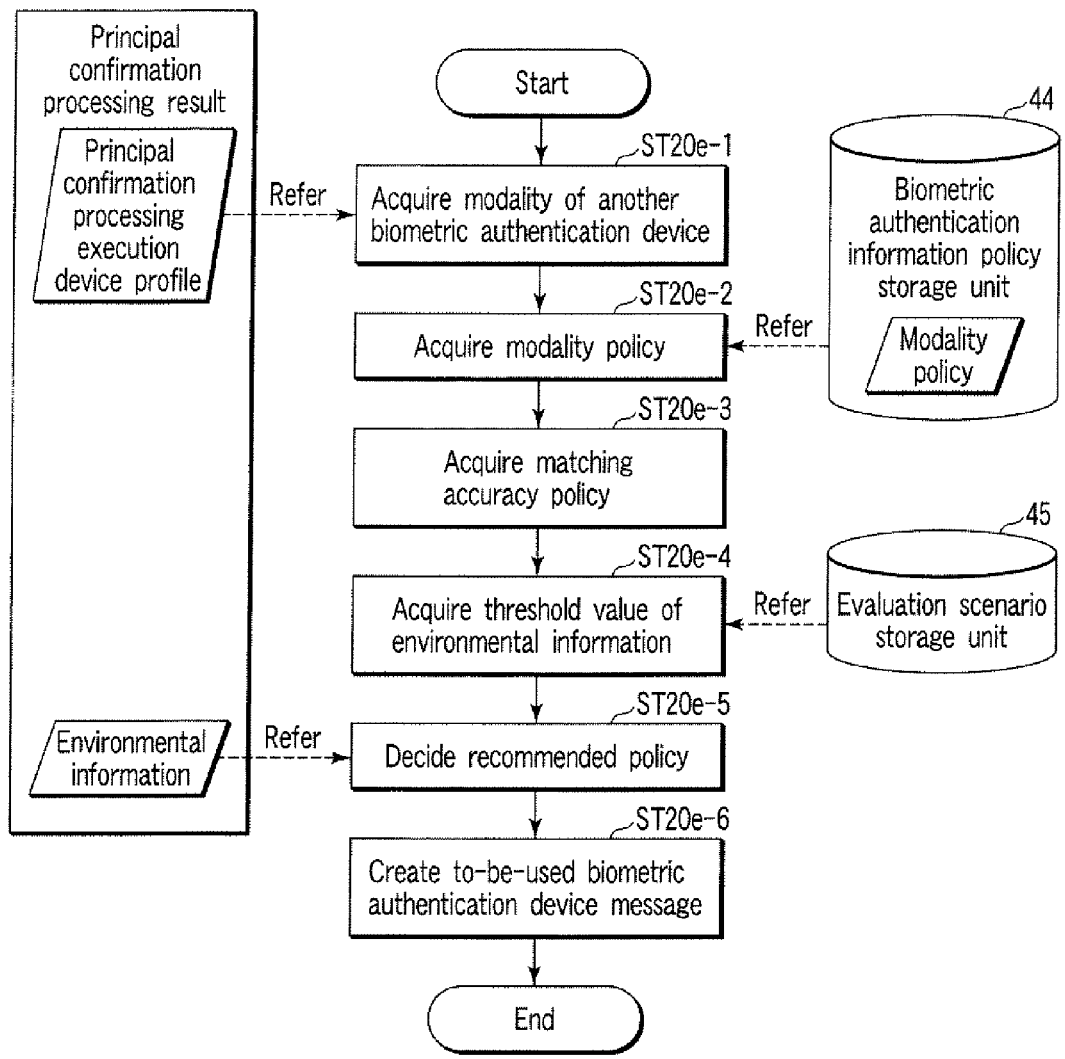
F I G. 36

SYSTEM, APPARATUS, AND PROGRAM FOR BIOMETRIC AUTHENTICATION

CROSS-REFERENCE TO RELATED APPLICATIONS

This application is based upon and claims the benefit of priority from prior Japanese Patent Application No. 2007-007309, filed Jan. 16, 2007, the entire contents of which are incorporated herein by reference.

BACKGROUND OF THE INVENTION

1. Field of the Invention

The present invention relates to a biometric authentication system, a biometric authentication apparatus, and a biometric authentication program capable of reducing a possibility of re-failure due to an environmental problem during a retry of a biometric authentication.

2. Description of the Related Art

Examples of a conventional client-server online biometric authentication system include a client matching system and a server matching system.

In the client matching system, a template for matching ("matching template") is created from biological information acquired in advance, and a client matches the acquired biological information with the template using a biological information capturing device during an authentication and transmits a matching result to a server, thereby performing a user authentication.

In the server matching system, a server holds a matching template created from biological information acquired in advance, biological information acquired in client environment is transferred to the server, and the server matches the transferred biological information with the template, thereby performing a user authentication.

The biological authentication system can prevent the occurrence of lost and theft of knowledge and property and prevent masquerading as compared with a conventional authentication system using knowledge such as a password and property such as an IC card. Therefore, it is known that a system ensuring higher security can be constructed.

As a system performing a safe biometric authentication online, there is known a system disclosed in Jpn. Pat. Appln. KOKAI Publication No. 2006-11768. In the system disclosed therein, each client apparatus (hereinafter, "client") performing a biometric authentication outputs a context describing a result of a processing performed by the client itself (i.e., an authentication context) and authentication contexts output from all the clients are transmitted to a server apparatus (hereinafter, "server").

The server can verify contents of biometric authentication processings performed by the clients by verifying these authentication contexts. At this time, an authenticator (e.g., an electronic signature) corresponding to the contents of the authentication context is created and described in the authentication context using secret information held by each client in secret. Namely, each client assures contents described in the corresponding authentication context by the authenticator. By verifying the contents of the authentication contexts and the authenticators, the server can verify the validity of the biometric authentication processings performed by the respective clients.

Although the conventional technique for performing the online biometric authentication as stated above has no serious problem normally, considerations of the inventor of the present invention indicate that it is necessary to improve the conventional technique for a processing performed if it is determined that an authentication result fails.

As for a conventional password authentication system, there is known a method of rejecting a predetermined number of authentication requests to the same account (hereinafter "account lock method") according to the number of failures in authentication (hereinafter, "retry count") so as to prevent leakage of a password as a result of server interference by a large number of illegal accesses and repeated attacks.

However, if the account lock method for locking the same account according to the number of authentication failures is used in the biometric authentication system, the following problems resulting from properties characteristic of the biometric authentication occur, unlike in the conventional password authentication system.

Cases of failures in biometric authentication include not only cases where biological information on an illegal user does not match with a template for a normal user but also cases involved with surrounding environments. Examples of the cases involved with surrounding environments include a case where a surrounding luminance is low for a face authentication, a case where fingers are dry or wet with sweat for a fingerprint authentication, and a case where loud noise is present for a voiceprint authentication. In these cases, biological information on the normal user is input as a value greatly different from the template.

However, the biometric authentication system using the account lock method determines whether to provide services only based on a matching result. Due to this, the system is unable to discriminate whether a biometric authentication failure is caused by an illegal user or by the environmental problem with a normal user. As a result, if there is an environmental problem with a normal user, then a biometric authentication fails by as much as the retry count and provision of services to the normal user are rejected despite the presence of the normal user.

BRIEF SUMMARY OF THE INVENTION

It is an object of the present invention to provide a biometric authentication system, a biometric authentication apparatus, and a biometric authentication program capable of reducing the possibility of re-failure due to an environmental problem at the time of a retry of a biometric authentication.

In a first aspect of the present invention, there is provided a biometric authentication system comprising: a client apparatus which executes a biometric authentication and transmits obtained biometric authentication information; and a server apparatus which verifies the validity of the biometric authentication information received from the client apparatus based on a predetermined biometric authentication policy, wherein the client apparatus includes: an environmental information acquisition device configured to acquire environmental information by measuring a luminance, a humidity or a biological detection-related environment during execution of the biometric authentication; and a device configured to transmit the environmental information as well as the biometric authentication information to the server apparatus, and wherein the server apparatus includes: an environmental information policy storage device having stored, in advance, an environmental information policy indicating a condition to be satisfied by the environmental information during the biometric authentication; a retry policy storage device having stored, in advance, retry policy information in which information indicating that a "biometric authentication information verification result is legal or illegal", information indicating that an "environmental information verification result is illegal", and information indicating "permission of retry" are made to correspond to one another; an environmental information verification device configured to verify the validity of the environmental information received from the client apparatus based on the environmental information policy; a determination device configured to determine whether the biometric authentication information verification result using the biometric authentication policy and the environmental information verification result using the environmental information verification device correspond to the "permission of the retry" based on the retry policy information; and a device configured to return an improvement message related to the environmental information to the client apparatus if the determination device determines that the biometric authentication information verification result using the biometric authentication policy and the environmental information verification result using the environmental information verification device correspond to the "permission of the retry".

According to the first aspect of the present invention, the client apparatus transmits the luminance, the humidity or the biological detection-related environmental information during execution of the biometric authentication as well as biometric authentication information to the server apparatus. The server apparatus transmits the improvement message related to the environmental information to the client apparatus if it is determined that the "biometric authentication information verification result is legal or illegal" and the "environmental information verification result is illegal".

In response to the improvement message, the client apparatus executes a retry while referring to the improvement message related to the environmental information. It is, therefore, possible to reduce the possibility of re-failure caused by the environmental problem at the time of the retry of the biometric authentication.

BRIEF DESCRIPTION OF THE SEVERAL VIEWS OF THE DRAWING

FIG. 1 is a pattern diagram showing an overall configuration of a biometric authentication system according to a first embodiment of the present invention;

FIG. 2 is a pattern diagram showing a configuration of a client apparatus according to the first embodiment;

FIG. 3 is a pattern diagram showing a configuration of environmental information according to the first embodiment;

FIG. 4 is a pattern diagram showing a configuration of a principal confirmation processing result according to the first embodiment;

FIG. 5 is a pattern diagram showing a configuration of a biometric authentication processing execution result according to the first embodiment;

FIG. 8 is a pattern diagram showing a configuration of a biometric authentication information policy storage unit according to the first embodiment;

FIG. 10 is a pattern diagram showing a configuration of a retry policy storage unit according to the first embodiment;

FIG. 11 is a pattern diagram showing an example of an improvement message according to the first embodiment;

FIGS. 15A and 15B are pattern diagrams showing examples of a principal confirmation information verification result according to the first embodiment, respectively;

FIG. 16 is a pattern diagram showing a configuration of a client apparatus according to a second embodiment of the present invention;

FIG. 17 is a pattern diagram showing a configuration of a server apparatus according to the second embodiment;

FIGS. 18 and 19 are flowcharts for explaining an operation according to the second embodiment;

FIG. 20 is a pattern diagram showing a configuration of a retry policy storage unit according to the second embodiment;

FIG. 21 is a pattern diagram showing a configuration of a client apparatus according to a third embodiment of the present invention;

FIG. 22 is a pattern diagram showing a configuration of a server apparatus according to the third embodiment;

FIG. 26 is a pattern diagram showing a configuration of a client apparatus according to a fourth embodiment of the present invention;

FIG. 29 is a pattern diagram showing a configuration of a server apparatus according to a fifth embodiment of the present invention;

FIG. 30 is a pattern diagram showing the relationship between a modality policy and an evaluation scenario according to the fifth embodiment;

FIG. 31 is a pattern diagram showing a configuration of an evaluation scenario storage unit according to the fifth embodiment;

FIG. 36 is a flowchart for explaining an operation according to a seventh embodiment of the present invention.

DETAILED DESCRIPTION OF THE INVENTION

Figure 6:
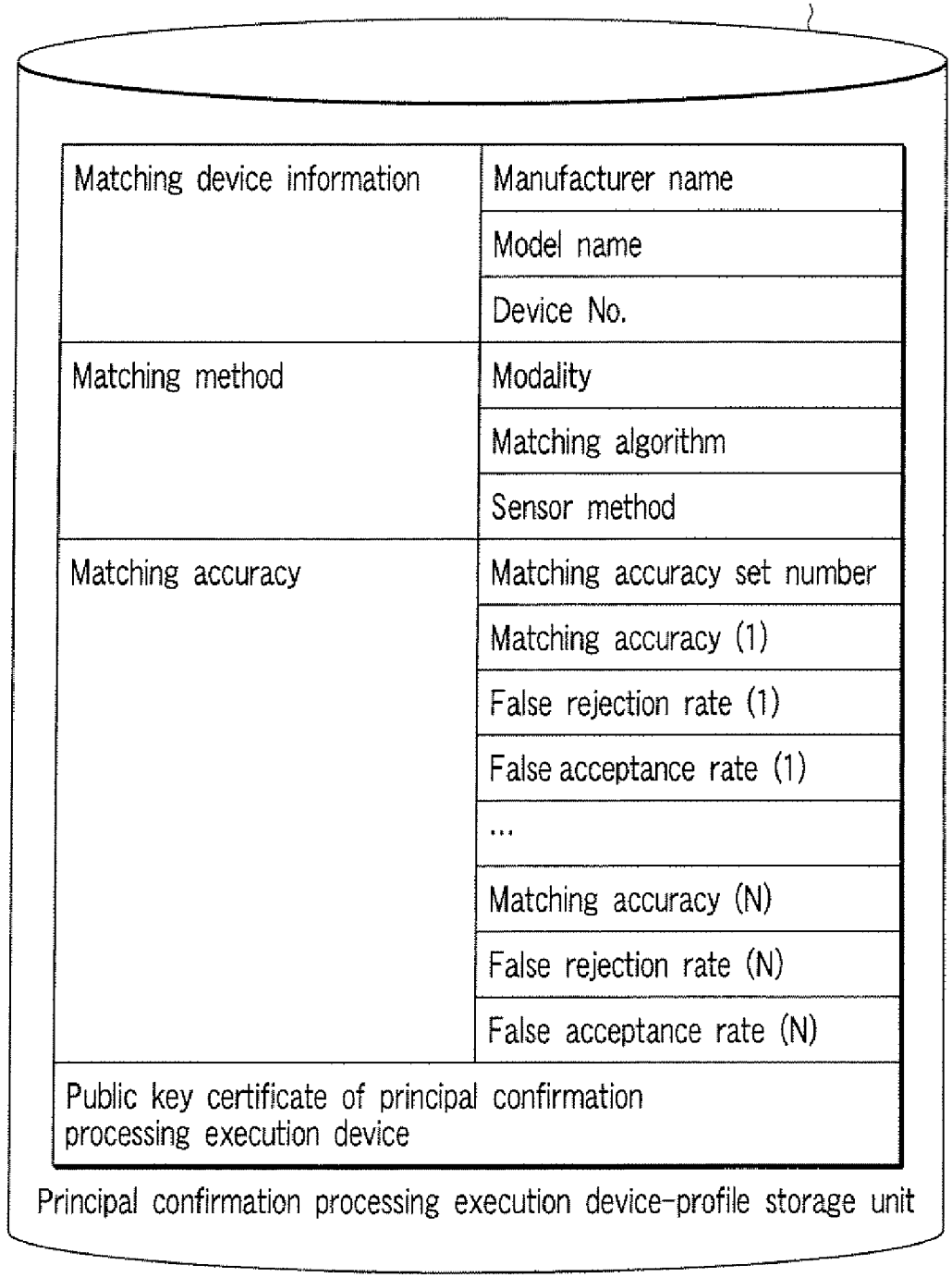
FIG. 6 is a pattern diagram showing a configuration of a principal confirmation processing execution device-profile storage unit according to the first embodiment.

Embodiments of the present invention will be described hereinafter with reference to the drawings. It is to be noted that each of respective apparatuses, devices or units can be realized either by a hardware configuration or a combination configuration of hardware resources and software. As the software in the combination configuration, a program installed from a network or a storage medium M to a corresponding apparatus 10 or 20 in advance for realizing functions of the corresponding apparatus 10 or 20 is used as shown in FIG. 1, 2, 7, 16, 17, 21, 22, 26, 27, 29, 33 or 34.

First Embodiment

FIG. 1 is a pattern diagram showing an overall configuration of a biometric authentication system according to a first embodiment of the present invention. The biometric authentication system shown in FIG. 1 includes a client apparatus (hereinafter, "client") 10 used by a user and a server apparatus (hereinafter, "server") 20 authenticating whether a biometric authentication target is a user registered in advance. The client 10 and the server 20 are connected to a network NW such as the Internet or intranet to be communicable with each other.

The client 10 includes a communication unit 1, a template storage device 2, an environmental information acquisition device 3, and a principal confirmation processing execution device 4.

The communication unit 1 includes functions of communicating with the server 20, e.g., a function of transmitting an authentication request to the server 20, a function of receiving a principal confirmation processing request from the server 20 and outputting the principal confirmation processing request to the principal confirmation processing execution device 4, and a function of transmitting a principal confirmation processing execution result output from the principal confirmation processing execution device 4 to the server 20.

The template storage device 2 stores therein biological information on (i.e., a template of) a user registered in advance, and has a function of outputting the template in response to a request from the principal confirmation processing execution device 4. If the server 20 performs a part of a biometric authentication processing or particularly matches the template with biological information acquired by a biometric authentication processing execution unit 6 during an authentication, the template storage device 2 need not be included in the client 10 but in the server 20.

The environmental information acquisition device 3 includes functions of measuring luminance, humidity or biological detection-related environmental information from outside of the client 10 and acquiring environmental information in response to a request from the principal confirmation processing execution device 4, and outputting the acquired environmental information to the principal confirmation processing execution device 4. As shown in FIG. 3, the environmental information is information on, for example, the luminance, humidity or biological detection-related environmental information, and suffices to include at least one of the luminance-related environmental information, the humidity-related environmental information, and the biological detection-related environmental information. Each of the environmental information of these types has a great influence on a quality of the biological information acquired by a biological information acquisition unit 7 and a biometric authentication processing result. In the case of a face authentication, for example, biological information (face information) acquired in an environment of insufficient luminance reduces a probability of success in authentication.

Among the types of environment information, the luminance-related environmental information is information on a luminance in a client environment at the time of acquiring the biological information, e.g., a value obtained by measuring a luminance of the client 10 in luxes at the time of acquiring the biological information. The humidity-related environmental information is information on a humidity in the client environment at the time of acquiring the biological information, e.g., a value obtained by measuring an amount of water in the air in % at the time of acquiring the biological information. The biological detection-related environmental information is information on biological detection performed by the client 10 at the time of acquiring the biological information, e.g., a result of measuring whether the user does a vital activity when the client 10 acquires the biological information.

As the environmental information acquisition device 3, hardware resources, e.g., a sensor such as a luminance meter or a hygrometer, or a biological detector detecting whether the user does a vital activity from a capacitance of a user's palm can be used.

The principal confirmation processing execution device 4 includes functions of acquiring the biological information on the user, executing a biometric authentication processing such as a template matching processing either partially or entirely, and outputting the obtained biometric authentication processing execution result and the environmental information acquired from the environmental information acquisition device 3 to the communication unit 1 as a principal confirmation processing execution result.

Specifically, as shown in FIG. 2, the principal confirmation processing execution device 4 includes a principal confirmation processing execution unit 5, the biometric authentication processing execution unit 6, the biological information acquisition execution unit 7, and a principal confirmation processing execution device-profile storage unit 8.

The principal confirmation processing execution unit 5 controls a principal confirmation processing performed by the units 6 to 8, and creates a principal confirmation processing result. As shown in FIG. 4, information including the biometric authentication processing execution result shown in FIG. 5 and the environmental information shown in FIG. 3 is used as the principal confirmation processing result.

The biometric authentication processing execution unit 6 is controlled by the principal confirmation processing execution unit 5, executes the biometric authentication processing such as a processing for matching a sample received from the biological information acquisition execution unit 7 with the template received from the template storage device 6 either partially or entirely, and outputs the biometric authentication processing result to the principal confirmation processing execution unit 5 as the biometric authentication processing execution result.

The biometric authentication processing includes a signal processing performed on the sample, a processing for converting a signal processing result into information which can be matched with the template, a matching processing for matching a conversion result with the template and for detecting a similarity between them, and the like. The biometric authentication processing executed by the biometric authentication processing execution unit 6 may be executed by a device outside of the principal confirmation processing execution device 4. Alternatively, if the biometric authentication processing can be divided into a plurality of processings, the divided biometric authentication processings may be executed by a plurality of external devices, respectively. In the latter case, it is preferable that the respective external devices execute the processings safely and communicate with one another safely. The biometric authentication processing execution result can be the sample or data obtained by subjecting the sample to the signal processing or converting a format of the sample if, for example, the server 20 performs the matching processing as stated above. Alternatively, the biometric authentication processing execution result can be data indicating the is similarity between the sample and the template if the biometric authentication processing execution unit 6 performs the matching processing. In another alternative, information on an algorithm of the biometric authentication processing, qualities of the template and the sample, a certificate of the template, and matching accuracy may be output as the biometric authentication processing execution result.

As shown in FIG. 5, for example, the biometric authentication processing execution result includes a matching result, the matching accuracy, a matching algorithm, a false rejection rate, a false acceptance rate, and the like. The biometric authentication processing execution result may include not only information on the biometric authentication processing but also information such as challenge data for preventing retransmission attack. Moreover, if information evaluated by a third party such as certificates of various types shown in FIG. 5 is held, it is preferable for the biometric authentication processing execution result to include the information evaluated by the third party.

The biological information acquisition execution unit 7 is controlled by the principal confirmation processing execution unit 5, acquires the biological information on the user using an input/output device (not shown), and outputs the biological information to the biometric authentication processing execution unit 6 as the sample.

The principal confirmation processing execution device-profile storage unit 8 is a storage device that can read information from the principal confirmation processing execution unit 5. As shown in FIG. 6, the principal confirmation processing execution device-profile storage unit 8 stores a principal confirmation processing execution device profile, and outputs the principal confirmation processing execution device profile to the principal confirmation processing execution unit 5 in response to a request from the principal confirmation processing execution unit 5. The principal confirmation processing execution device profile is configured to include device information such as a manufacturer name and a device name of the principal confirmation processing execution device 4, a matching method such as a modality (e.g., fingerprint, face, vein) indicating a type of a biological matching method and a matching algorithm, the matching accuracy indicating the false rejection rate and the false acceptance rate according to the matching accuracy, and a public key certificate of the principal confirmation processing execution device 4. While information assuring the device information on the principal confirmation processing execution device 4 and the like is mentioned as the principal confirmation processing execution device profile, the principal confirmation processing execution device profile is not limited to the information shown in FIG. 6. Alternatively, another type of information such as a device certificate assuring the information on the principal confirmation processing execution device 4 may be used as the principal confirmation processing execution device profile.

Figure 7:
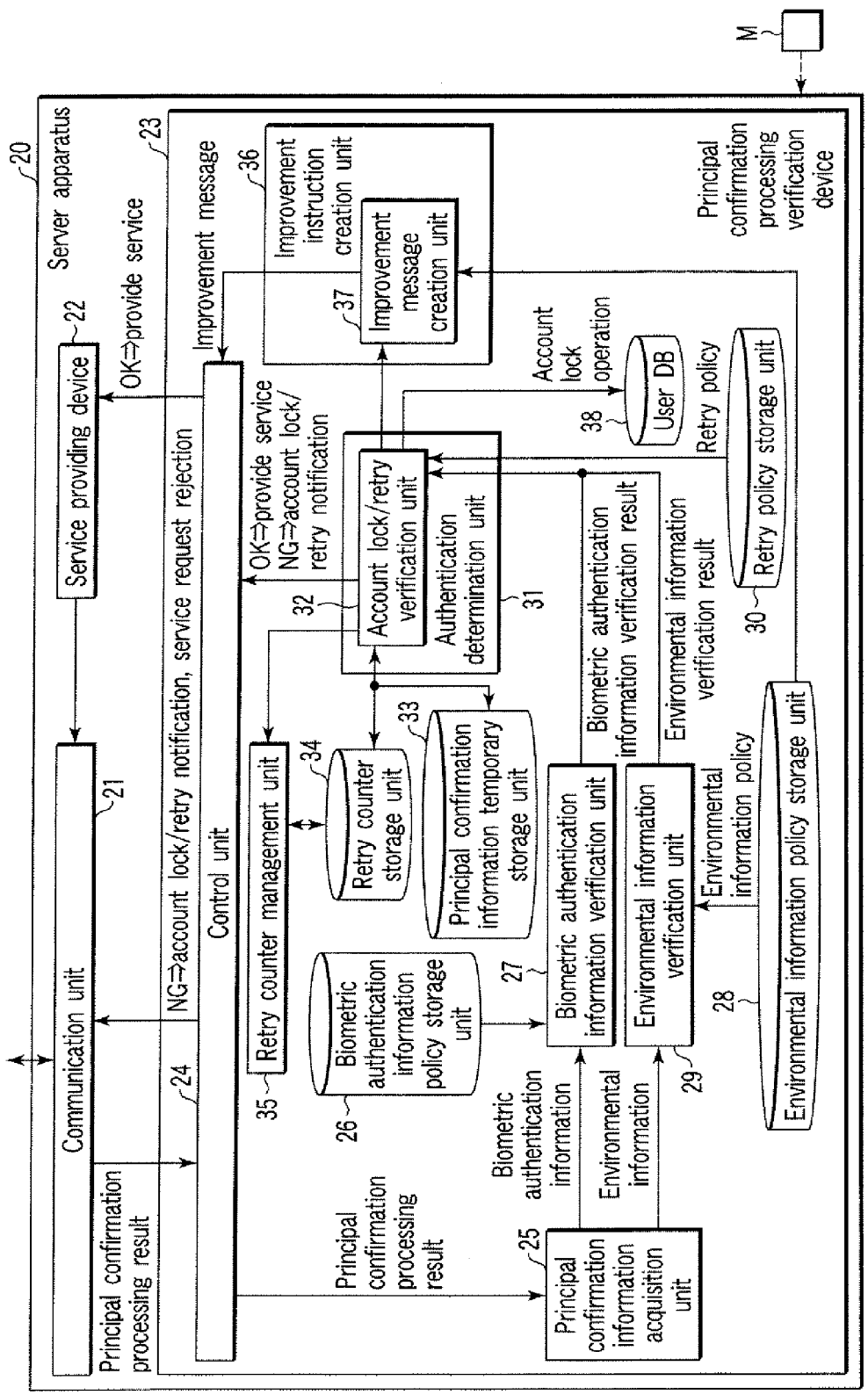
FIG. 7 is a pattern diagram showing a configuration of a server apparatus according to the first embodiment.

Meanwhile, as shown in FIGS. 1 and 7, the server 20 includes a communication unit 21, a service providing device 22, a principal confirmation processing verification device 23, a control unit 24, a principal confirmation information acquisition unit 25, a biometric authentication information policy storage unit 26, a biometric authentication information verification unit 27, an environmental information policy storage unit 28, an environmental information verification unit 29, a retry policy storage unit 30, an authentication determination unit 31, an account lock/retry verification unit 32, a principal confirmation information temporary storage unit 33, a retry counter storage unit 34, a retry counter management unit 35, an improvement instruction creation unit 36, an improvement message creation unit 37, and a user database (DB) 38.

The communication unit 21 holds a communication with the client 10, for example, receives the principal confirmation processing execution result from the client 10 and transmits an improvement message to the client 10.

The service providing device 22 provides services to the client 10 based on an output from the principal confirmation processing verification device 23.

The principal confirmation processing verification device 23 performs an identify verification by verifying the validity of the principal confirmation processing execution result received from the communication unit 21 using the units or devices 24 to 38, and decides whether to provide services as a result of the identify verification or executes a control such as account lock.

The control unit 24 controls the principal confirmation processing verification device 23.

The principal confirmation information acquisition unit 25 extracts the biometric authentication information that is the biometric authentication processing execution result, and the environmental information, from the principal confirmation processing result received via the communication unit 21 from the client 10. The principal confirmation information acquisition unit 25 includes functions of outputting the biometric authentication information to the biometric authentication information verification unit 27 and outputting the environmental information to the environmental information verification unit 29.

The biometric authentication information policy storage unit 26 is a storage device that can read information from the biometric authentication information verification unit 27. As shown in FIG. 8, the biometric authentication information policy storage unit 26 stores therein a biometric authentication information policy in which a matching algorithm which the server 20 can receive for principal confirmation, the false rejection rate, the false acceptance rate, the quality of the biological information, the matching accuracy, and the like are specified in advance. The biometric authentication information policy includes essential items such as the matching accuracy, the false rejection rate, and the false acceptance rate, and optional items to be verified optionally to correspond to cases where the policy includes or does not include the optional items, such as the template certificate and the device certificate, according to the client 10.

The biometric authentication information verification unit 27 determines whether the biometric authentication information received from the principal confirmation information acquisition unit 25 conforms to the biometric authentication information policy stored in the biometric authentication information policy storage unit 26, and outputs a determination result to the account lock/retry verification unit 32 as the biometric authentication information verification result.

Figure 9:
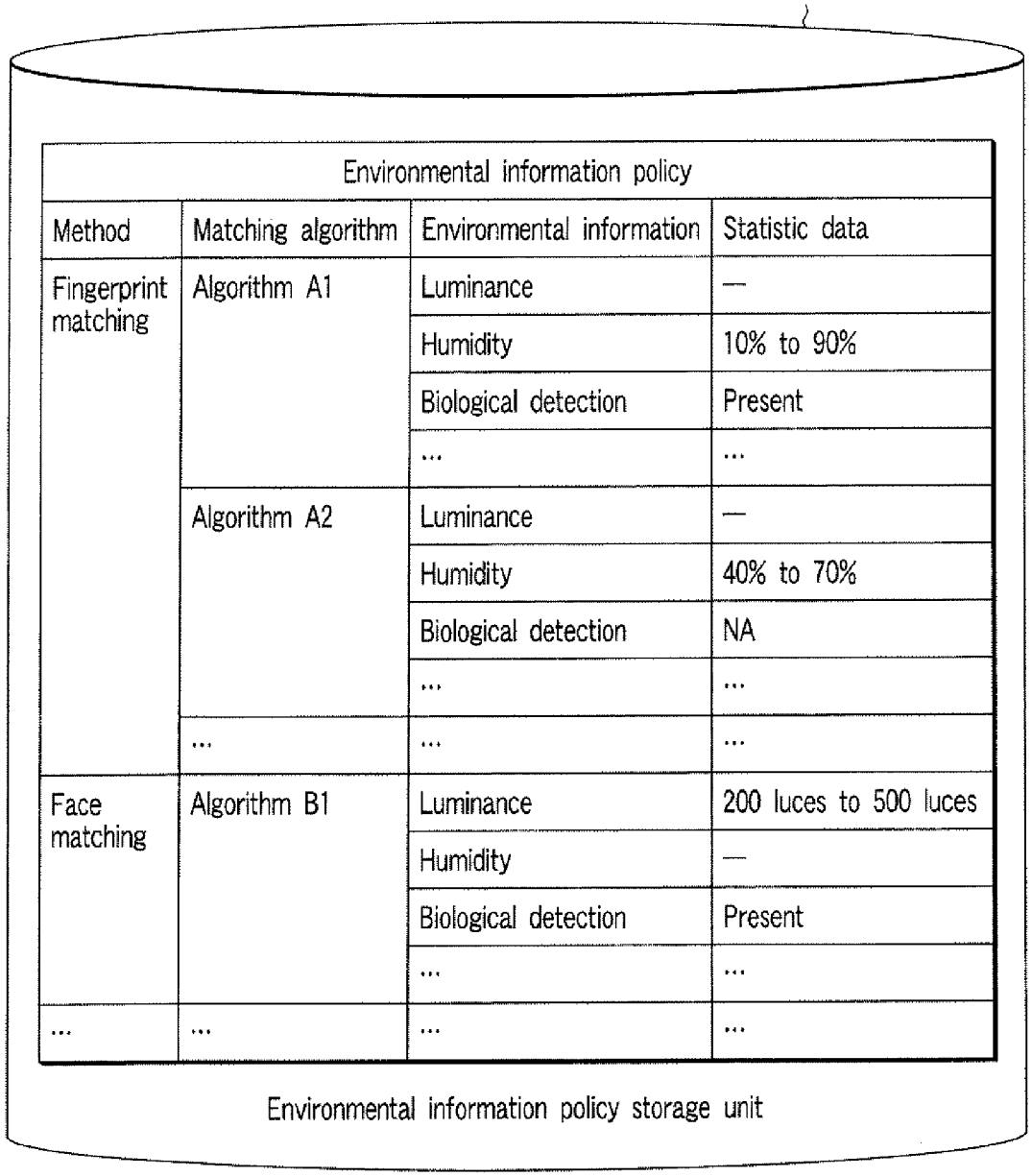
FIG. 9 is a pattern diagram showing a configuration of an environmental information policy storage unit according to the first embodiment.

The environmental information policy storage unit 28 is a storage device that can read information from the environmental information verification unit 29. As shown in FIG. 9, the environmental information policy storage unit 28 stores therein an environmental information policy in which conditions to be satisfied by the environmental information such as the luminance-related environmental information, the humidity-related environmental information, and the biological detection-related environmental information during the biometric authentication are specified in advance. In the environmental information policy, an environmental range in which the authentication processing can be executed correctly based on, for example, statistic data is set to correspond to every algorithm.

The environmental information verification unit 29 determines whether the environmental information received from the principal confirmation information acquisition unit 25 conforms to the environmental information policy stored in the environmental information policy storage unit 28, and outputs a determination result to the account lock/retry verification unit 32 as the environmental information verification result.

The retry policy storage unit 30 is a storage device that can read information from the account lock/retry verification unit 32. As shown in FIG. 10, the retry policy storage unit 30 stores therein account lock/retry policy information (hereinafter, also simply "retry policy"). The account lock/retry policy information is conditional information in which a verification result of the biometric authentication information verification unit 27, a verification unit of the environmental information verification unit 29, a past principal confirmation result, a principal confirmation success (OK) or a principal confirmation failure (NG), and "permission of retry" or "account lock" are made to correspond to one another.

For example, in FIG. 10, information indicating the "permission of retry" (i.e., "encouragement to do retry" in an account lock/retry operation) is made to correspond mainly to information indicating that "the verification result of the biometric authentication information verification unit 27 is legal or illegal" (i.e., "OK" or "NG" as the principal confirmation result) and information indicating that "the verification result of the environmental information verification unit 29 is illegal" (i.e., "environment information is out of a range of statistic operation" and "biological detection information is not present" as the principal confirmation information verification result).

Furthermore, information indicating "account lock" (i.e., "account locking in the account lock/retry operation) is made to correspond mainly to information indicating that "the verification result of the biometric authentication information verification unit 27 is illegal" (i.e., "NG" as the principal confirmation result), information indicating that "the verification result of the environmental information verification unit 29 is illegal" (i.e., "environment information is out of the range of statistic operation" and "biological detection information is not present" as the principal confirmation information verification result), and information indicating that "past retry count is equal to or greater than predetermined number" (i.e., "retry count is three or more" in the principal confirmation information verification result).

In the example shown in FIG. 10, if the principal confirmation information verification result includes an item corresponding to the account lock/retry policy, an operation specified by the policy is performed. Since a policy setting depends on a service administrator, completely different policies may be set according to services to be provided.

The authentication determination unit 31 includes an account lock/retry verification unit 32.

The account lock/retry verification unit 32 includes the following functions (f32-1) to (f32-3).

(f32-1): A function of determining whether the verification result of the biometric authentication information verification unit 27, the verification result of the environmental information verification unit 29 correspond to the principal confirmation success (OK) or the principal confirmation failure (NG), i.e., "permission of retry" or "account lock" based on the verification result of the biometric authentication information verification unit 27, the verification result of the environmental information verification unit 29, the retry policy stored in the retry policy storage unit 30, and the past principal confirmation information stored in the principal confirmation information temporary storage unit 33.

(f32-2): A function of outputting the principal confirmation information verification result (e.g., environmental information is out of range of statistic data) to the improvement message creation unit 37 and controlling the retry counter management unit 35 to increment the retry count stored in the retry counter storage unit 34 if the verification result of the biometric authentication information verification unit 27 and the verification result of the environmental information verification unit 29 correspond to the principal confirmation success (OK) or "permission of retry" as the principal confirmation failure (NG) as a result of the determination.

(f32-3): A function of locking an account of the user stored in the user DB 38 if the verification result of the biometric authentication information verification unit 27 and the verification result of the environmental information verification unit 29 correspond to the principal confirmation success (OK) or the "account lock" as the principal confirmation failure (NG) as a result of the determination.

The account lock/retry verification unit 32 may change settings of the retry and the account lock using a combination of the principal confirmation information verification information and the retry count of the previous authentication stored in the principal confirmation information temporary storage unit 33. In this case, the retry counter management unit 35 controls a retry counter to count retries and stores the retry count in the retry counter storage unit 34. The retry counter is made to correspond to the principal confirmation processing result using data included in a retry request. For example, by making the retry counter correspond to challenge data for preventing retransmission attack, the challenge data is included in the principal confirmation processing result. It is, therefore, possible to verify the retry count. Furthermore, a field indicating the retry count may be created so as to make the retry counter correspond to the fact of doing retries, and a retry counter management method and a binding method may be arbitrarily set.

It is thereby possible to grant an unlimited retry right to the client 10 if it cannot be judged that an illegal biometric authentication is performed, and to lock the account if the client environment is not improved. It is also possible to change a strength of the account lock according to the retry count and the verification result.

For example, in FIG. 10, if the principal confirmation result is NG (illegal), the cause for the NG is clearly the setting of the environmental information, and it is discovered that the retry count is three by referring to the principal confirmation information temporary storage unit 33 and the retry counter storage unit 34, it is possible to set the account lock to level [LOW]. Examples of the levels and strengths of the account lock will be described. The level [LOW] corresponds to a strength at which the account is valid after locking the account for one hour. The level [MEDIUM] corresponds to a strength at which the account is valid after locking the account for one day. The level [HIGH] corresponds to a strength at which the account cannot be unlocked without making an inquiry to a service provider or a server administrator.

The principal confirmation information temporary storage unit 33 stores therein a verification result of the account lock/retry verification unit 32 for a preset certain period as the principal confirmation information.

The retry counter storage unit 34 is updated by the retry counter management unit 35 and stores therein the retry count for every user.

The retry counter management unit 35 is controlled by the account lock/retry verification unit 32 and increments the retry counter.

The improvement instruction creation unit 36 includes the improvement message creation unit 37.

The improvement message creation unit 37 creates improvement information on the environmental information based on the principal confirmation information verification result output from the account lock/retry verification unit 32 while referring to the environmental information policy storage unit 28, and creates an improvement message for notifying the client 10 of the improvement information if the principal confirmation information verification result of the account lock/retry verification unit 32 corresponds to "permission of retry". FIG. 11 shows an example of the improvement message. While the improvement message creation unit 37 creates the improvement message in the embodiment, the unit 37 may be configured to conduct a negotiation so as to reflect a content of the improvement message in the client 10. Alternatively, the unit 37 may create the improvement message so as to correspond to the environmental policy.

Figure 12:
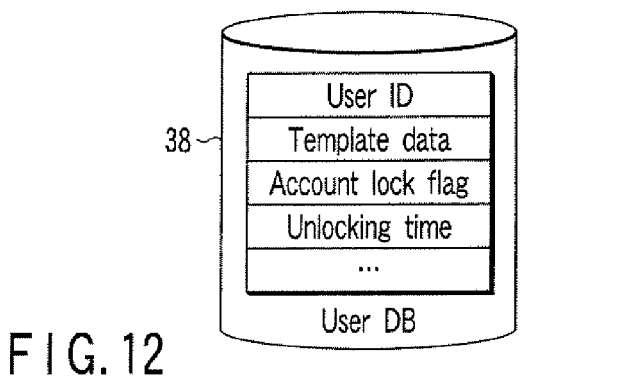
FIG. 12 is a pattern diagram showing a configuration of a user DB according to the first embodiment.

The user DB 38 is a storage device that can read/write information from/to the account lock/retry verification unit 32. As shown in FIG. 12, the user DB 38 stores therein the accounts of all users registered in advance as well as information as to whether the account is locked The user DB 38 includes a user ID corresponding to the account of the user and template data as an optional item if the template of the user is registered in the server 20. The user DB 38 also holds an account lock flag indicating an account lock state and includes unlocking time and the like.

If the server 20 performs a part of the biometric authentication processing or particularly matches the template with the biological information (sample) acquired by the client 10 at the time of the authentication, then the principal confirmation processing result which the server 20 receives from the client 10 is input to the biometric authentication execution unit 6 and the template storage device 2 of the client 10, the biometric authentication execution unit 6 matches the template stored in the template storage device 2 with the biological information (sample) included in the principal confirmation processing result, describes the matching result together with the biometric authentication result in the principal confirmation processing result, and inputs the biometric authentication result to the principal confirmation processing verification device 23 of the server 20.

Figure 13:
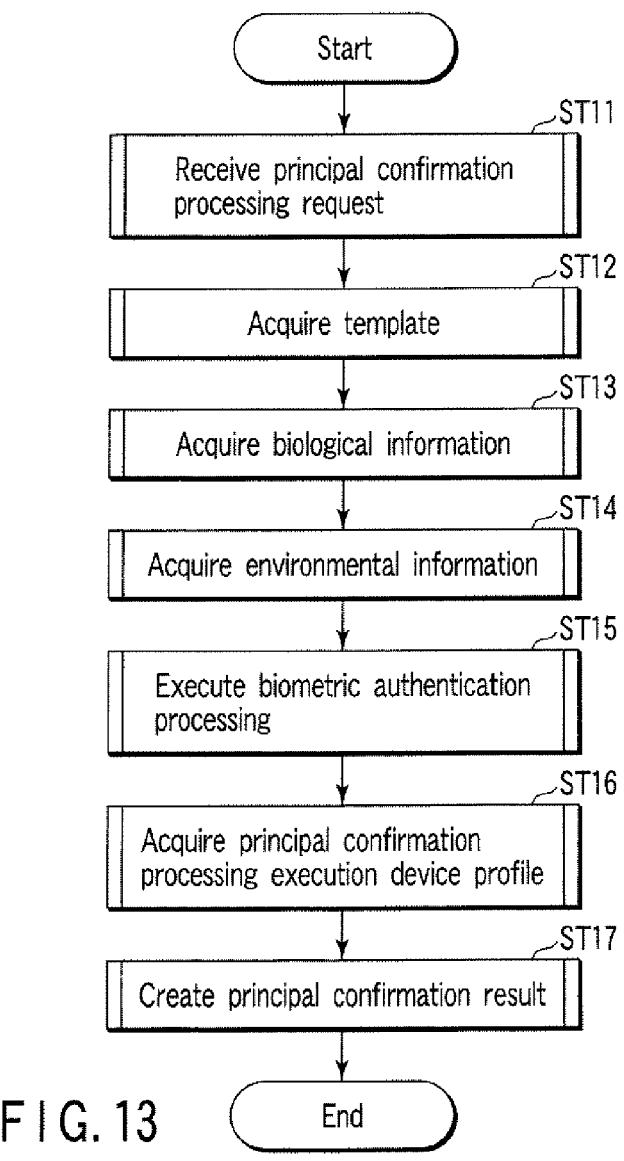
FIGS. 13 and 14 are flowcharts for explaining an operation according to the first embodiment.
Figure 14:
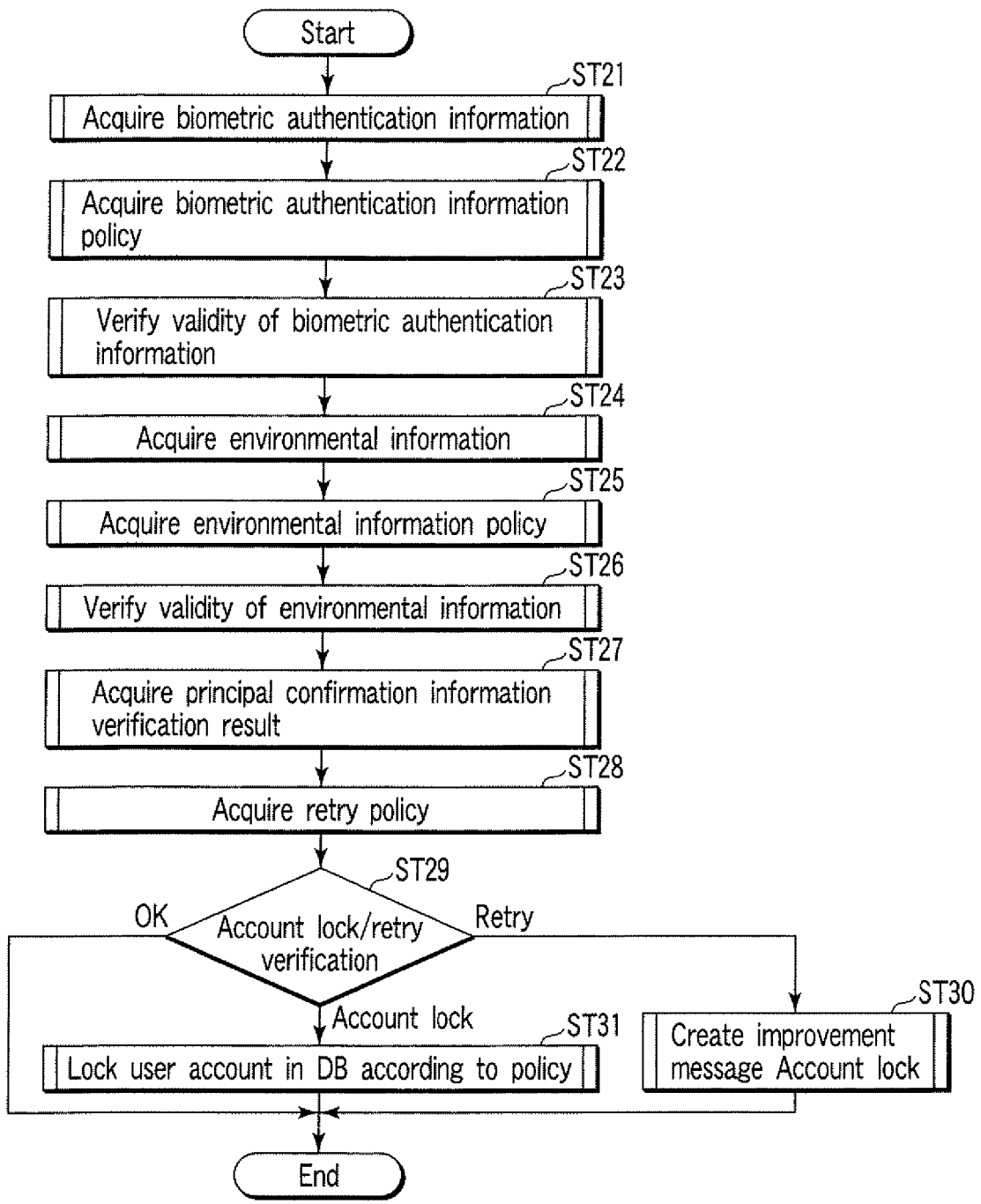

An operation performed by the biometric authentication system configured as stated above will be described with reference to the flowcharts of FIGS. 13 and 14.

(Preparation)

The client 10 registers the user in the server 20 in advance by the user's operation, and the account of the user is created and stored in the user DB 38 of the server 20. The client 10 registers the biological information on the user as well as the account of the user in the server 20 or registers the biological information in a reliable organization by the user's operation. The registered biological information (i.e., template) is stored in the template storage device 2 such as an IC card, and either distributed to the user or stored in a template storage device (not shown) included in the server 20. At this time, it is preferable to store a certificate (i.e., template certificate) in which a signature of the server or the reliable organization is added to the template or information that can identify the template so as to assure the validity of the template.

(Principal Confirmation Processing: FIG. 13)

If the user wants to access the server 20 or to enjoy services, the client 10 transmits an authentication request to the server 20 based on the user's operation. When receiving the authentication request, the server 20 transmits a principal confirmation processing request to the client 10.

When the client 10 receives the principal confirmation processing request (ST11), the communication unit 1 of the client 10 transmits the principal confirmation processing request to the principal confirmation processing execution unit 5 of the principal confirmation processing execution device 4. When receiving the principal confirmation processing request, the principal confirmation processing execution unit 5 transmits a template acquisition request to the template storage device 2 (ST12). When receiving the template acquisition request, the template storage device 2 outputs the template stored therein to the biometric authentication processing execution unit 6 of the principal confirmation processing execution device 4.

The principal confirmation processing execution unit 5 also transmits a biological information acquisition request to the biological information acquisition execution unit 7 (ST13). When receiving the biological information acquisition request, the biological information acquisition execution unit 7 acquires biological information on the user using the input/output device (not shown), and outputs the acquired biological information to the biometric authentication processing execution unit 6 as a sample. As the input/output device, a fingerprint sensor, a camera or the like is applicable.

Furthermore, the principal confirmation processing execution unit 5 transmits an environmental information acquisition request to the environmental information acquisition device 3 in parallel to the biological information acquisition request (ST14). When receiving the environmental information acquisition request, the environmental information acquisition device 3 measures the luminance, humidity or biological detection-related environment outside of the client 10 at the time of acquiring the biological information, acquires the environmental information, and outputs the environmental information to the principal confirmation processing execution unit 5.

The principal confirmation processing execution unit 5 may execute transmission of the biological information acquisition request and the environmental information acquisition request prior to the template acquisition request, and then execute transmission of the template acquisition request.

After transmitting these requests, the principal confirmation processing execution unit 5 transmits a biometric authentication processing execution request to the biometric authentication processing execution unit 6 (ST15). When receiving the biometric authentication processing execution request, the biometric authentication processing execution unit 6 executes a biometric authentication processing using the template received from the template storage device 2 and the sample received from the biological information acquisition execution unit 7, and outputs the result of the biometric authentication processing to the principal confirmation processing execution unit 5 as the biometric authentication processing execution result.

Next, the principal confirmation processing execution unit 5 transmits a principal confirmation processing execution device-profile request to the principal confirmation processing execution device-profile storage unit 8 (ST16). When receiving the principal confirmation processing execution device-profile request, the principal confirmation processing execution device-profile storage device B outputs the principal confirmation processing execution device profile to the principal confirmation processing execution unit 5.

It is to be noted that the principal confirmation processing execution unit 5 may transmit the principal confirmation processing execution device-profile request at any stage from reception of the principal confirmation processing request to the creation of the principal confirmation result.

Finally, the principal confirmation processing execution unit 5 creates the principal confirmation processing result including the environmental information received from the environmental information acquisition device 3 and the biometric authentication processing execution result received from the biometric authentication processing execution unit 6 (ST17), and transmits the principal confirmation processing result to the server 20 via the communication unit 1.

(Verification Processing: FIG. 14)

When receiving the principal confirmation processing result via the communication unit 21, the control unit 24 of the server 20 transmits the principal confirmation processing result to the principal confirmation information acquisition unit 25.

The principal confirmation information acquisition unit 25 extracts the biometric authentication processing execution result and the environmental information from the principal confirmation processing result, outputs the extracted biometric authentication processing execution result to the biometric authentication information verification unit 27 as the biometric authentication information, and outputs the extracted environmental information to the environmental information verification unit 29.

When receiving the biometric authentication information (ST21), the biometric authentication information verification unit 27 acquires the biometric authentication information policy stored in the biometric authentication information policy storage unit 26 (ST22). The biometric authentication information verification unit 27 verifies whether the received biometric authentication information conforms to the biometric authentication information policy (ST23), and outputs the verification result to the account lock/retry verification unit 32 as the biometric authentication information verification result.

When receiving the environmental information (ST24), the environmental information verification unit 29 acquires the environmental information policy stored in the environmental information policy storage unit 28 (ST25). The environmental information verification unit 29 verifies whether the received environmental information conforms to the environmental information policy (ST26), and outputs the verification result to the account lock/retry verification unit 32 as the environmental information verification result.

When receiving the biometric authentication information verification result and the environmental information verification result (hereinafter, collectively "principal confirmation information verification result") (ST27), the account lock/retry verification unit 32 acquires the retry policy stored in the retry policy storage unit 30 (ST28). The account clock/retry policy verification unit 32 determines whether the principal confirmation information verification result corresponds to the principal confirmation success (OK) or the principal confirmation failure (NG), i.e., "permission of retry" or "account lock" (ST29), and outputs the determination result to the control unit 24.

If the account clock/retry verification unit 32 determines that the principal confirmation information verification result corresponds to the "permission of retry", the account clock/retry verification unit 32 may output the principal confirmation information verification result to the message creation unit 37 based on the retry policy so as to create the improvement message (ST30). Furthermore, the account clock/retry verification unit 32 stores the principal confirmation information verification result in the principal confirmation information temporary storage unit 33. If the account clock/retry verification unit 32 determines that the principal confirmation information verification result corresponds to the "account lock", the account clock/retry verification unit 32 locks the account of the user stored in the user DB 38 (ST31).

FIGS. 15A and 15B show a first example and a second example of the principal confirmation information verification result, respectively. Each of the first and second examples shows a result of a combination of the verification result of the biometric authentication information verification unit 27 and that of the environmental information verification unit 29.

According to the first example of the principal confirmation information verification result, it is verified that the biometric authentication processing result, the environmental information at the time of the biometric authentication, and the environmental information on the client environment are satisfactory. Therefore, services are provided to the client 10. According to the second example of the principal confirmation information verification result, by contrast, the cause for the NG as the biometric authentication result is the insufficient luminance (brightness) of the client environment. Therefore, the processing goes to encouragement of a message for improving the environmental information to be created.

When receiving the principal confirmation information verification result from the account lock/retry verification unit 32, the improvement message creation unit 37 outputs a preset improvement message to the control unit 24.

Finally, the control unit 24, which has received the verification result from the account lock/retry verification unit 32, requests the service providing device 22 to provide services to the user if the verification result indicates OK. If the verification result indicates NG, the control unit 24 transmits the NG as the verification result to the client 10 via the communication unit 21. At this time, if a retry request is to be transmitted, the control unit 24 transmits the retry request as well as the improvement message received from the improvement message creation unit 37 to the client 10.

The improvement message transmitted to the client 10 is displayed by a display device d to notify the user of the improvement message.

As stated above, according to the first embodiment, the client 10 transmits the luminance-related, humidity-related or biological detection-related environmental information at the time of execution of the biometric authentication, as well as the biometric authentication information, to the server 20. If the "verification result of the biometric authentication information is legal or illegal" and the "verification result of the environmental information is illegal", the server 20 transmits the improvement message on the environmental information to the client 10. In response to the improvement message, the client 10 refers to the improvement message on the environmental information and then executes a retry. It is, therefore, possible to reduce the possibility of re-failures due to the environmental problem at the time of a retry of the biometric authentication.

Furthermore, since not only the authentication processing result but also the client environment can be integrally verified, it is possible to reject an authentication request from an illegal user. In addition, if there is a problem with, for example, the environmental setting, it is possible to prevent a normal user from failing in the authentication to result in the account lock. In this case, it is possible to encourage a normal user to do a retry instead of performing the account lock. When a normal user is encouraged to do a retry, such user can be notified of an improvement method in the form of the improvement message since the cause for the user's failure in the biometric authentication is already verified.

Moreover, since the notification of the improvement message indicates the cause for the user's failure in the biometric authentication and the improvement method, the possibility of a re-failure in the biometric authentication at the time of the retry can be reduced.

Further, many causes for the NG as the biometric authentication verification result exist. The conventional system is incapable of detecting such causes and uniquely locks the account of a user according to the retry count. According to the first embodiment, the retry or account lock can be controlled according to the policies held in the server 20, depending on the respective causes.

Moreover, the authentication determination unit 31 does not necessarily determine whether to lock the account of a user, and the function of determining whether to lock the account of a user may be added if desired.

Namely, referring to FIG. 7, with a minimum configuration of the server 20, it suffices that the account lock/retry verification unit 32 is a retry determination unit, and there is no need to provide the retry counter management unit 35, the retry counter storage unit 34, and the principal confirmation information temporary storage unit 33 for determining account lock and retry. Besides, there is no need to operate the user DB 38 for the account lock, or to store the account lock-related policy in the retry policy storage unit 30.

Referring further to FIG. 7, in the present embodiment, the account lock/retry verification unit 32 in the authentication determination unit 31 determines which operation is to be performed; the retry operation, the account lock operation, or the service providing operation, based on the biometric authentication result and the environmental information verification result. However, the function of the account clock/retry verification unit 32 is not limited to the above-stated function. The account clock/retry verification unit 32 may be configured to make another determination based on the biometric authentication result and the environmental information verification result. Namely, an item of determination made by the authentication determination unit 31 may be arbitrarily set. The same holds true for the subsequent embodiments.

Second Embodiment

A biometric authentication system according to a second embodiment of the present invention will be described. The biometric authentication system according to the second embodiment is intended to prevent forgery and falsification of environmental information by being configured, as compared with the biometric authentication system according to the first embodiment, so that the client 10 describes the environmental information in an authentication context and notifies the server 20 of the authentication context in a manner similar to a method disclosed in Jpn. Pat. Appln. KOKAI Publication No. 2006-11768. Namely, the configuration using the authentication context makes it possible to assure the processing results according to the first embodiment, and to determine not to permit a retry regardless of a biometric authentication result if the falsification or an illegal processing is detected during the verification. It is, therefore, possible to construct a safer system.

Specifically, similarly to the method disclosed in Jpn. Pat. Appln. KOKAI Publication No. 2006-11768, the client 10 creates an authentication context and transmits the authentication context to the server 20. At this time a principal confirmation processing result including environmental information is also described in the authentication context. The server 20 can thereby verify the validity of the principal confirmation processing result.

The biometric authentication system according to the second embodiment will be described in detail with reference to FIGS. 16 to 20. It is to be noted that similar devices, units, and functions to those according to the first embodiment will not be described herein. The same holds true for subsequent embodiments.

An overall configuration of the biometric authentication system according to the second embodiment is similar to that shown in FIG. 1.

As shown in FIG. 16, the principal confirmation processing execution device 4 included in the client 10 includes a biometric authentication context creation execution unit 5a in place of the principal confirmation processing execution unit 5, and additionally includes a secret information storage unit 9 and an authenticator creation unit 11.

The biometric authentication context creation execution unit 5a controls a principal confirmation processing performed by each of the units 6 to 9 and 11, and creates the biometric authentication context in which an authenticator is added to the principal confirmation processing result.

The secret information storage unit 9 is a storage device that can read information from the authenticator creation unit 11, and stores therein secret information for creating the authenticator.

The authenticator creation unit 11 includes a function of creating the authenticator based on the secret information stored in the secret information storage unit 9 with respect to authenticator target data received from the biometric authentication context creation execution unit 5a, and a function of outputting the created authenticator to the biometric authentication context creation execution unit 5a.

As shown in FIG. 17, the principal confirmation processing verification device 23 included in the server 20 includes a biometric authentication context verification execution unit 40 in place of the principal confirmation processing verification unit 25, and additionally includes an authenticator verification unit 41 and an authenticator verification information storage unit 42.

The biometric authentication context verification execution unit 40 controls authenticator verification of the biometric authentication context received from the client 10, and extracts biometric authentication information that is the biometric authentication processing result and the environmental information from the biometric authentication context.

The authenticator verification unit 41 verifies the validity of the authenticator of the biometric authentication context received from the biometric authentication context verification execution unit 40 based on authenticator verification information stored in the authenticator verification information storage unit 42.

The authenticator verification information storage unit 42 is a storage device that can read information from the authenticator verification unit 41 and stores therein information for verifying the authenticator described in the biometric authentication context.

Figure 19:
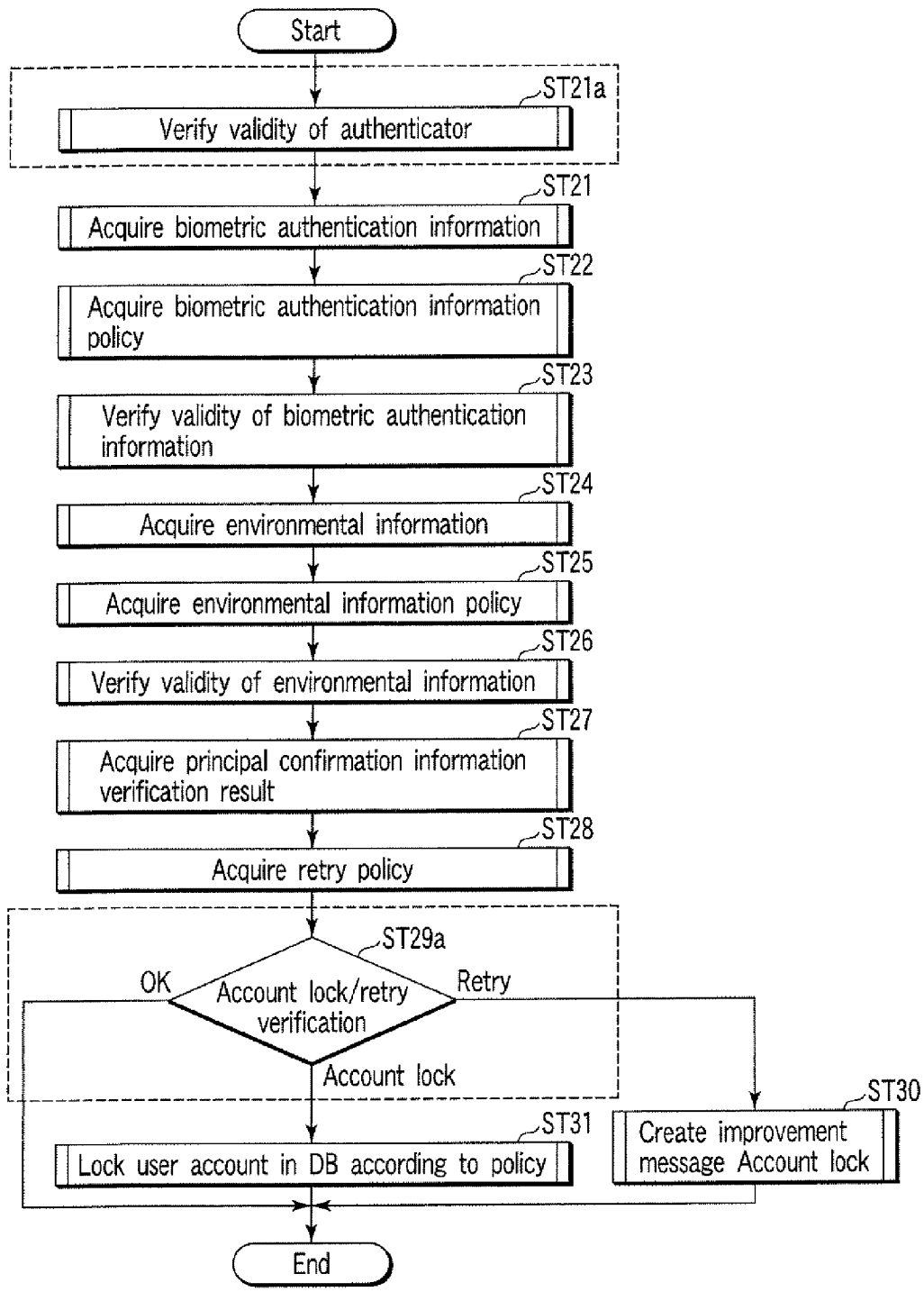

An operation performed by the biometric authentication system configured as stated above will next be described with reference to the flowcharts of FIGS. 18 and 19.

(Preparation)

It is assumed that the client 10 registers a user similarly to the first embodiment.

(Principal Confirmation Processing: FIG. 18)

If the user wants to access the server 20 or to enjoy services, the client 10 transmits an authentication request to the server 20 based on the user's operation similar to that in the first embodiment. When receiving the authentication request, the server 20 transmits an authentication context creation request to the client 10.

The communication unit 1 of the client 10 transmits the received authentication context creation request to the biometric authentication context creation execution unit 5a of the principal confirmation processing execution device 4.

When receiving the authentication context creation request (ST11a), the biometric authentication context creation execution unit 5a performs a principal confirmation processing similar to that in the first embodiment (ST12 to ST16). Since the processings at the steps ST12 to ST16 are similar to those controlled by the principal confirmation processing execution unit 5 according to the first embodiment, they will not be described herein.

Thereafter, the biometric authentication context creation execution unit 5a transmits an authentication context creation request to the authenticator creation unit 11 together with the environmental information received from the environmental information acquisition device 3, the biometric authentication processing execution result received from the biometric authentication processing execution unit 6, and the principal confirmation processing execution device profile as authenticator target data. The authenticator target data may include not only the execution result but also various information for assuring the processings performed by the client 10 similarly to the data described in Jpn. Pat. Appln. KOKAI Publication No. 2006-11768.

The authenticator creation unit 11 creates an authenticator from the authenticator target data (ST17-2) based on the secret information stored in the secret information storage unit 9 (ST17-1), and outputs the authenticator to the biometric authentication context creation execution unit 5a.

The biometric authentication context creation execution unit 5a creates a biometric authentication context by adding the authenticator to the authenticator target data (ST17-3), and transmits the biometric authentication context to the server 20 via the communication unit 1.

(Verification Processing: FIG. 19)

The control unit 24 of the server 20 transmits the biometric authentication context received via the communication unit 21 to the biometric authentication context verification execution unit 40.

The biometric authentication context verification execution unit 40 outputs the biometric authentication context to the authenticator verification unit 41. The authenticator verification unit 41 verifies the validity of the authenticator included in the biometric authentication context based on authenticator verification information stored in the authenticator verification information storage unit 42 (ST21a). Further, the authenticator verification unit 41 outputs an authenticator verification result to the biometric authentication context verification execution unit 40.

The biometric authentication context verification unit 40 outputs the obtained authenticator verification result to the account lock/retry verification unit 32, and extracts the biometric authentication processing execution result and the environmental information from the biometric authentication context. Further, the biometric authentication context verification unit 40 outputs the biometric authentication processing execution result to the biometric authentication information verification unit 27 as biometric authentication information, and outputs the environmental information to the environmental information verification unit 29.

Since processings at subsequent steps ST21 to ST28 before the processing performed by the account lock/retry verification unit 32 are similar to those according to the first embodiment, they will not be described herein.

When receiving the biometric authentication information processing verification result, the environmental information verification result, and the authenticator verification result, the account clock/retry verification unit 32 not only executes the verification method according to the first embodiment but also determines whether the authenticator verification result corresponds to the principal confirmation success (OK) or the principal confirmation failure (NG), i.e., "permission of retry" or "account lock" based on the account/retry policy (ST29a). Thereafter, the account clock/retry verification unit 32 performs a processing of service providing, account lock, or retry according to the retry policy verification result, similarly to the first embodiment.

As stated above, the second embodiment can exhibit the advantages of the first embodiment. Further, by verifying the validity of the authenticator, it is possible to verify that the processings performed by the client 10 and obtained data are not falsified. It is therefore possible to construct a system ensuring higher security than the system according to the first embodiment.

For example, by adding the verification result of the authenticator of the biometric authentication context, it is possible to not only verify whether matching data is falsified and illegal authentication is performed but also verify the validity of the processings performed by the client 10, e.g., verify that no illegal devices are used. Due to this, it is possible to verify the validity of the processings performed by the client 10 in more detail and to set policies in more detail.

As shown in FIG. 20, for example, if the result indicates that the authentication context (authenticator) is illegal, it is presumed that the client 10 executes illegal processings such as falsification of data. Therefore, such a policy as to lock the account without providing services regardless of whether the matching result is OK (legal) can be set and stored in the retry policy storage unit 30.

Third Embodiment

A biometric authentication system according to a third embodiment of the present invention will be described. The biometric authentication system according to the third embodiment makes it possible to reject an illegal authentication request regardless of a matching result and to prevent an account of a normal user from being locked by being configured, in relation to the biometric authentication system according to the first embodiment, so that a verification device makes a notification of information on an authentication system and a modality held by a user in advance, and so that information on an authentication method to be adopted by the user is held as a policy.

A supplementary explanation will be given. The conventional password authentication system is often susceptible to an account lock attack for locking an account of a normal user by an illegal user by making an authentication fail intentionally using an ID of a normal user. Likewise, the conventional biometric authentication system is susceptible to an intentional account lock by an illegal user if the ID of the normal user is known.

Considering the conventional disadvantages, the biometric authentication system according to the present invention verifies the validity of the authentication system and that of the modality held by the user in advance with a view to preventing the intentional account lock by an illegal user.

An overall configuration of the biometric authentication system according to the third embodiment is similar to that shown in FIG. 1.

As shown in FIG. 21, the principal confirmation processing execution device 4 included in the client 10 includes a principal confirmation processing execution unit 5b that acquires principal confirmation processing information from respective devices or units connected to the client 10, and notifies the server 20 of the acquired information integrally as the principal confirmation processing information.

As shown in FIG. 22, a principal confirmation information acquisition unit 25b included in the server 20 includes the following functions. The principal confirmation information acquisition unit 25b performs a registration processing for binding the principal confirmation processing information transmitted from the client 10 with a user ID of a user and for registering the principal confirmation processing information and the user ID in a user DB 38b for the user. Further, the principal confirmation information acquisition unit 25b verifies whether the principal confirmation processing information registered in the user DB 38b coincides with the client 10 described in the principal confirmation processing result. If they coincide, the principal confirmation information acquisition unit 25b allows the processings according to the first embodiment to be subsequently performed. If they do not coincide, the principal confirmation information acquisition unit 25b does not allow the processings according to the first embodiment to be subsequently performed on the principal confirmation processing result but rejects a result of a principal confirmation request as NG (illegal).

Figure 23:
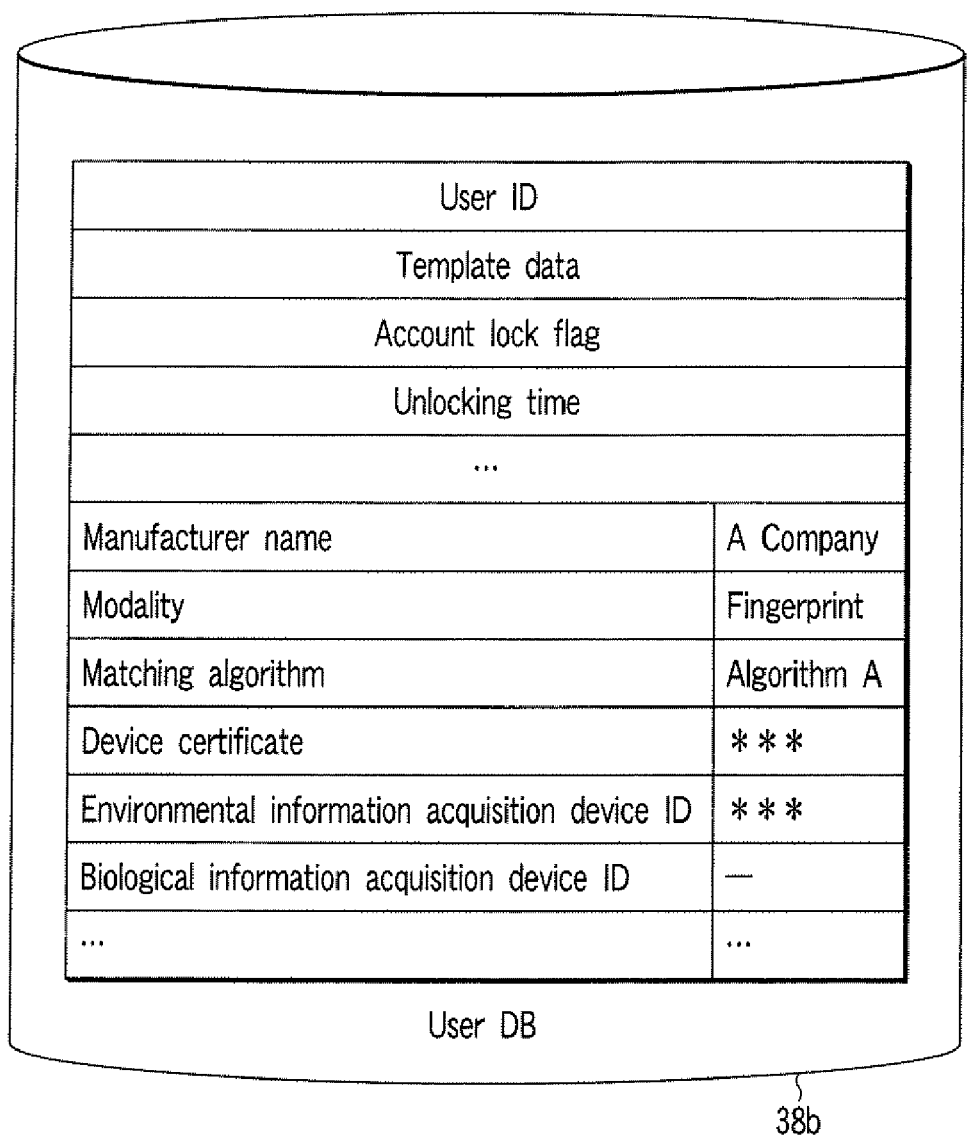
FIG. 23 is a pattern diagram showing a configuration of a user DB according to the third embodiment.

Accordingly, as shown in FIG. 23, the user DB 38b stores therein the principal confirmation processing information transmitted from the client 10 in advance. Examples of items stored in the user DB 38b include those for determining processings performed by the client 10. For example, a manufacturer name, a modality, a matching algorithm, a device ID of the environmental information acquisition device 3 connected to the client 10, and the like stored in the principal confirmation processing execution device profile may be set as the items.

Figure 24:
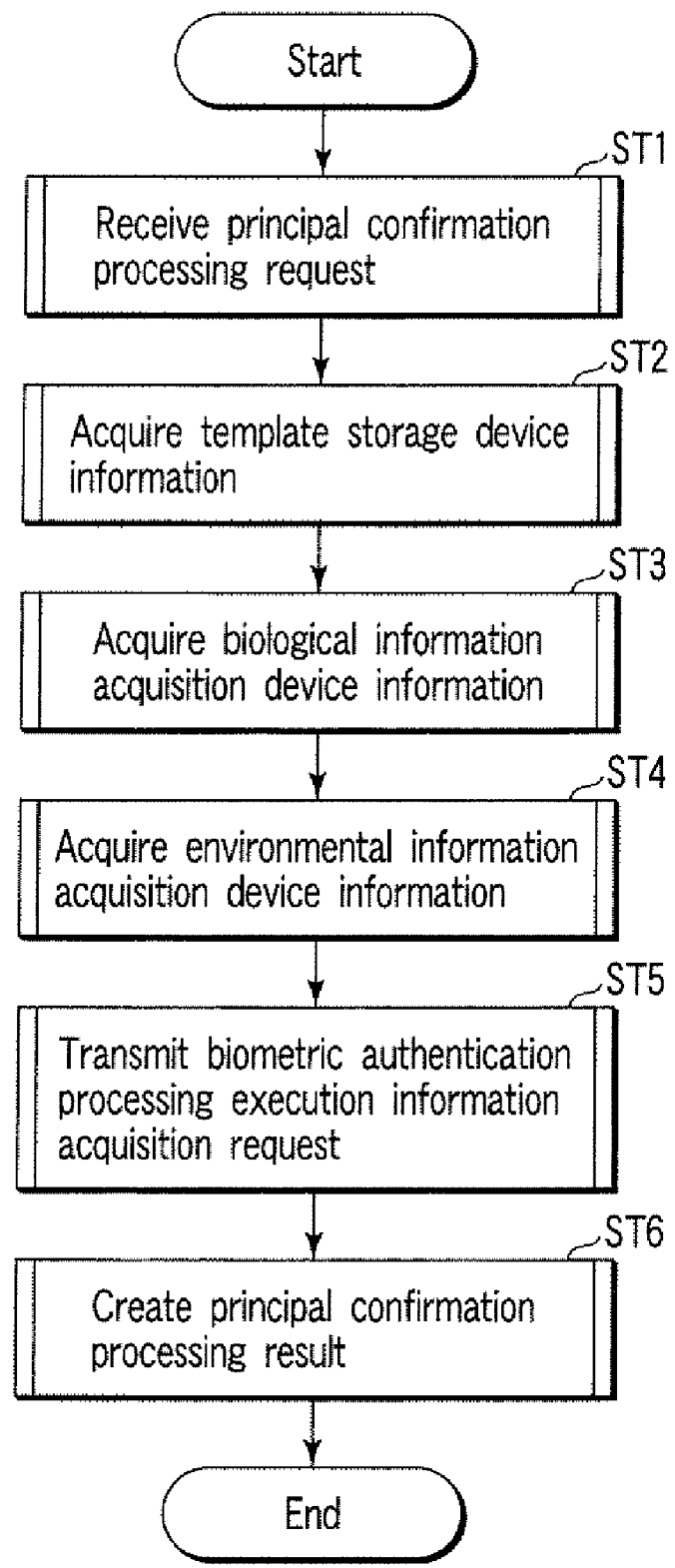
FIGS. 24 and 25 are flowcharts for explaining an operation according to the third embodiment.
Figure 25:
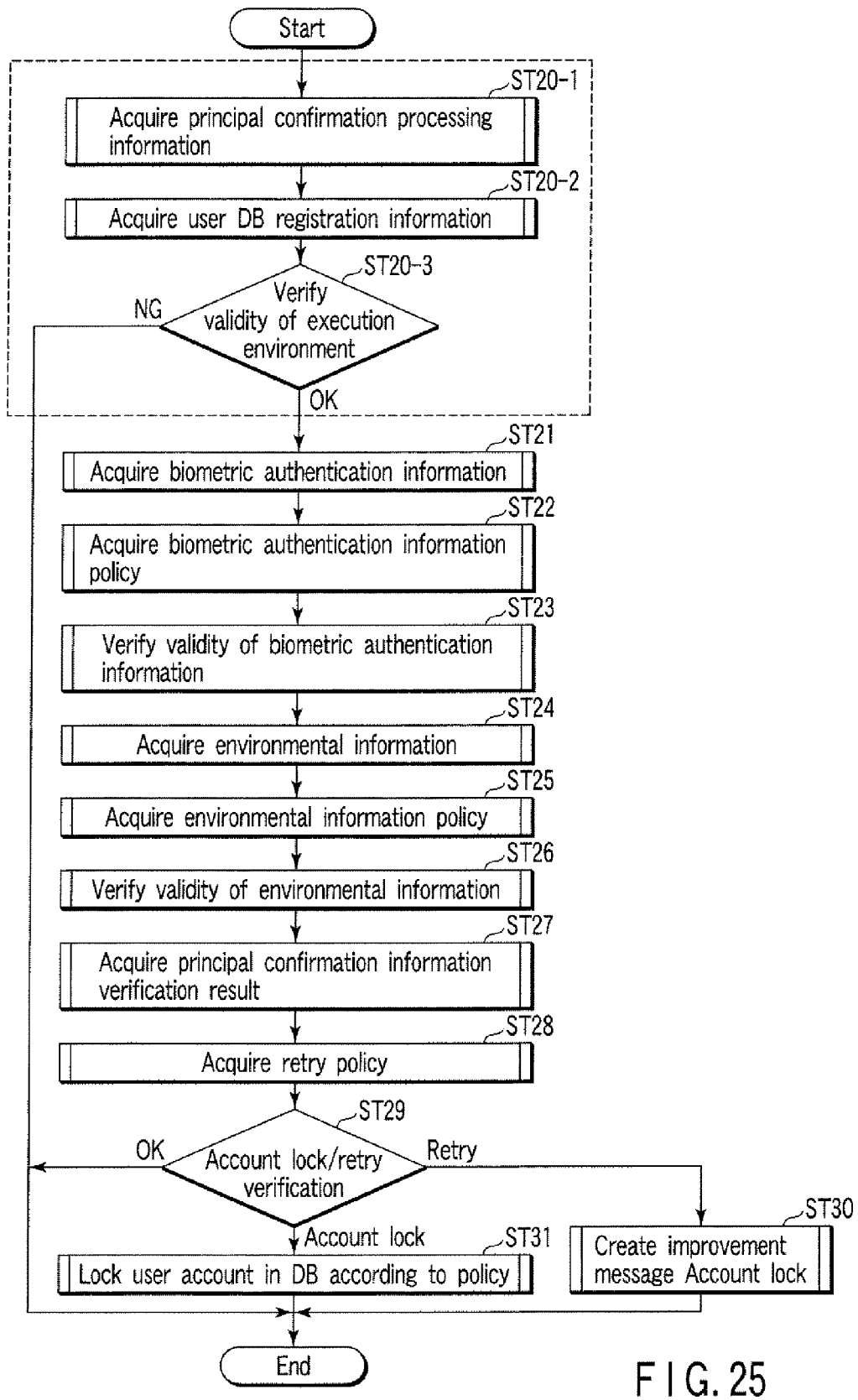

An operation performed by the biometric authentication system configured as stated above will next be described with reference to the flowcharts of FIGS. 24 and 25.

(Preparation)

The client 10 registers the user in the server 20 in advance by binding information on devices to be used during an authentication such as a biometric authentication device included in the client 10 with the user ID so as to prevent an authentication request from an illegal user and to prevent an account lock attack from the illegal user.

If the user wants to access the server 20 and to register information on the client 10, the client 10 transmits a client information registration request to the server 20 based on the user's operation. When receiving the client information registration request, the server 20 transmits a principal confirmation processing information request to the client 10.

(Principal Confirmation Processing Information Acquisition Processing: FIG. 24)

When the client 10 receives the principal confirmation processing information, the communication unit 1 of the client 10 transmits the principal confirmation processing information request to a principal confirmation processing execution unit 5b of the principal confirmation processing execution device 4. When receiving the principal confirmation processing information request (ST1), the principal confirmation processing execution unit 5b transmits a template storage device information acquisition request to the template storage device 2 (ST2). When receiving the template storage device information acquisition request, the template storage device 2 outputs information on the device 2 stored therein to the principal confirmation processing execution unit 5b of the principal confirmation processing execution device 4.

The principal confirmation processing execution unit 5b also transmits a biological information acquisition device information acquisition request to the biological information acquisition execution unit 7 (ST3). When receiving the biological information acquisition device information acquisition request, the biological information acquisition execution unit 7 outputs information on the input/output device (not shown) and information on a biological information acquisition device to the principal confirmation processing execution unit 5b.

Furthermore, the principal confirmation processing execution unit 5b transmits an environmental information acquisition device information acquisition request to the environmental information acquisition device 3 in parallel to the biological information acquisition device information acquisition request (ST4). When receiving the environmental information acquisition device information acquisition request, the environmental information acquisition device 3 outputs information on the device 3 to the principal confirmation processing execution unit 5b.

After transmitting these requests, the principal confirmation processing execution unit 5b transmits a biometric authentication processing execution information acquisition request to the biometric authentication processing execution unit 6 (ST5). When receiving the biometric authentication processing execution information acquisition request, the biometric authentication processing execution unit 6 outputs the principal confirmation processing execution device profile from the principal confirmation processing execution device-profile storage unit 8 to the principal confirmation processing execution unit 5b as information on the biometric authentication processing execution unit 6.

Finally, the principal confirmation processing execution unit 5b sets the respective pieces of received information as the principal confirmation information processing information (ST6), and transmits the principal confirmation information processing information to the server 20 via the communication unit 1.

At this time, the items of data transmitted from the client 10 need not necessarily be acquired from the above-stated devices or units, depending on the items of data requested by the server 20. Since the requested items of data are relevant to the items of the user DB 38b, the services to be provided, and the like, they are not limited to specific ones in detail.

When receiving the principal confirmation processing information, the server 20 registers the principal confirmation processing information in the user DB 38b while binding the principal confirmation processing information with the user ID as shown in, for example, FIG. 23.

(Principal Confirmation Processing)

Since the processings up to the principal confirmation processing performed by the client 10 are similar to those according to the first embodiment, they wilt not be described herein.

(Verification Processing: FIG. 25)

When the server 20 receives the principal confirmation processing result via the communication unit 21, the control unit 24 of the server 20 transmits the principal confirmation processing result to a principal confirmation information acquisition unit 25b.

The principal confirmation information acquisition unit 25b extracts the biometric authentication processing execution result and the environmental information from the received principal confirmation processing result (ST20-1).

The principal confirmation information acquisition unit 25b acquires the principal confirmation processing information registered while being bound with the user ID from the user DB 38b (ST20-2). The principal confirmation information acquisition unit 25b compares the registered execution environment with the execution environment acquired from the principal confirmation processing result and the information described in the principal confirmation processing execution device profile to verify whether they coincide (ST20-3).

If they do not coincide, the principal confirmation information acquisition unit 25b regards the acquisition request as an acquisition request from an illegal user, stops verifying the principal confirmation processing, and rejects the authentication request. If they coincide, the principal confirmation information acquisition unit 25b performs processings at steps ST21 to ST31 similarly to the first embodiment so as to verify the principal confirmation processing result. Since the processings at steps ST21 to ST31 are similar to those according to the first embodiment, they will not be described herein.

As stated above, the third embodiment can exhibit the advantages of the first embodiment. Further, it is possible to determine whether the authentication request is illegal by determining whether the environment at the time of execution of the principal confirmation coincides with the environment registered in advance. It is, therefore, possible to construct a system ensuring higher security than the system according to the first embodiment. Further, since it can be determined whether the authentication request is illegal before verifying the validity of the principal confirmation processing result, it is possible to lessen the burden on the server 20.

Moreover, there are a number of authentication accuracy authentication methods available for the biometric authentication, unlike in the conventional password authentication system. Due to this, some systems are vulnerable, depending on the authentication method or a combination of the authentication methods. Therefore, rejection of the authentication request based on the modality that is not held by the user is preferable for not only the user but also the server 20.

It is to be noted that the third embodiment may be applied to the second embodiment.

Fourth Embodiment

A biometric authentication system according to a fourth embodiment of the present invention will be described. The biometric authentication system according to the fourth embodiment actually tunes settings of the client 10 and corrects an environment setting of the client 10 in response to an instruction from the server 20 instead of transmitting a problem as a message, if it is discovered that there is a problem with the environmental setting at the time of a biometric authentication, and a retry is encouraged as described in the first embodiment.

By doing so, it is possible to avoid an instance in which the setting is not changed despite the is transmission of a message indicating the problem, and the biometric authentication result is determined as NG (illegal) again at the time of the retry. Furthermore, there is no need for the server 20 to perform useless authentications at the time of the retry. Further, the biometric authentication system according to the fourth embodiment is available even to a user without knowledge about problems characteristic of the biometric authentication and knowledge about a biometric authentication device. Further, since to what degree the environmental setting is to be actually corrected is also a problem characteristic to biometric authentication and is unfamiliar to ordinary users, it is preferable to automatically set the degree of correction.

An overall configuration of the biometric authentication system according to the fourth embodiment is similar to that shown in FIG. 1.

As shown in FIG. 26, the principal confirmation processing execution device 4 included in the client 10 is configured to additionally include an environmental information operation unit 12 as compared with the configuration shown in FIG. 2.

The environmental information operation unit 12 changes a surrounding environment of the input/output device (not shown) and the principal confirmation processing execution device 4 when the biological information acquisition execution unit 7 acquires biological information in response to a request from the principal confirmation processing execution unit 5.

The environmental information operation unit 12 can operate, for example, a device (not shown) such as lighting equipment to change the luminance or the like, which is environmental information on the surrounding environment, and change the environmental information on the surrounding environment in response to a request from the principal confirmation processing execution unit 5. To change the environmental information means to change, or example, the surrounding luminance to make the surrounding environment lighter or darker. The environmental information operation unit 12 may operate either in the biometric authentication processing execution unit 6 or in the environmental information acquisition device 3.

Accordingly, the principal confirmation processing execution unit 5 includes not only the above-stated functions but also a function of controlling the environmental information operation unit 12 based on an improvement instruction from the server 20.

Figure 27:
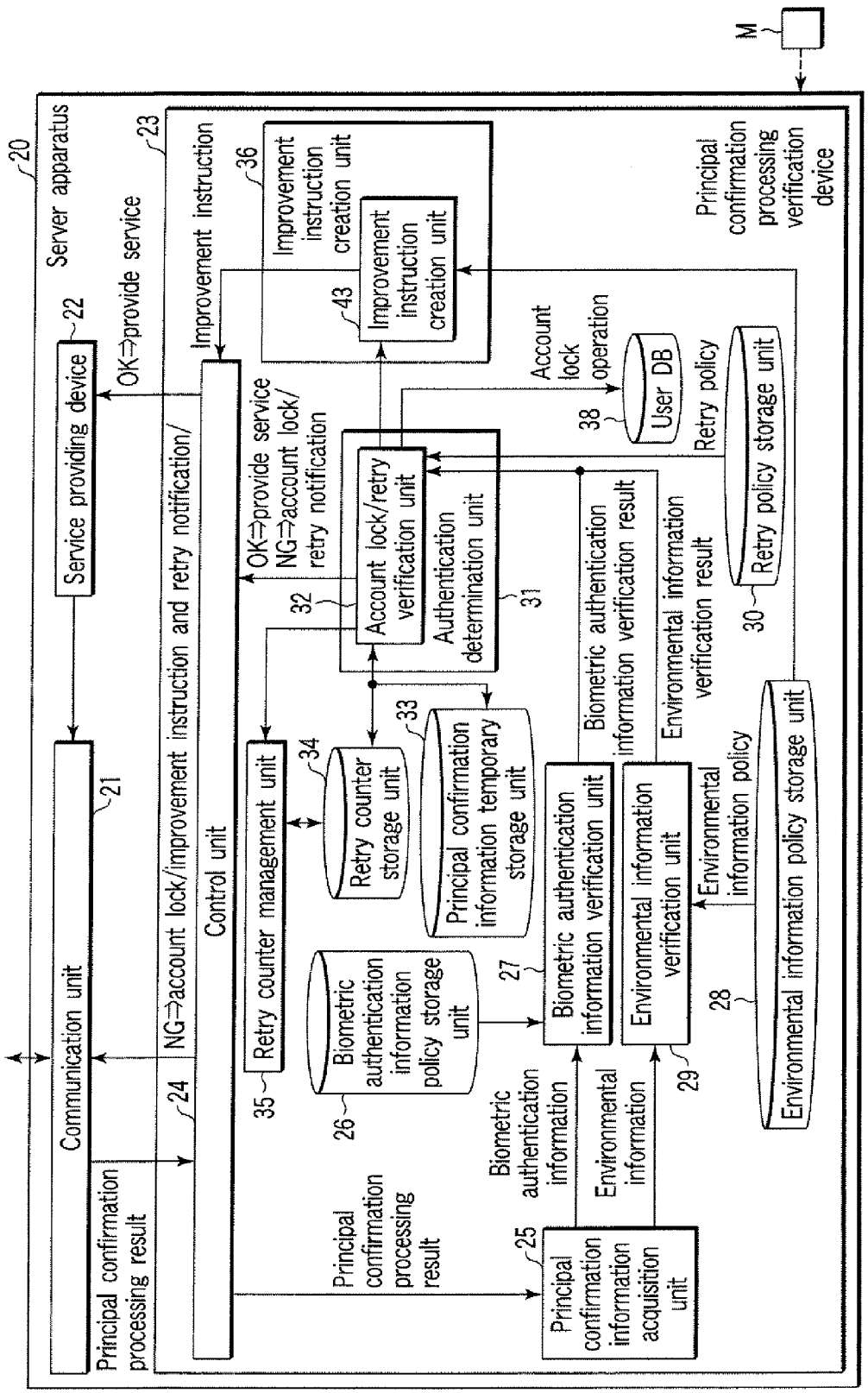
FIG. 27 is a pattern diagram showing a configuration of a server apparatus according to the fourth embodiment.

As shown in FIG. 27, the principal confirmation processing verification device 23 included in the server 20 includes an improvement instruction creation unit 43 in place of the improvement message creation unit 37, as compared with the configuration shown in FIG. 7.

The improvement instruction creation unit 43 includes a function of creating improvement information from the verification result output from the account lock/retry verification unit 32 while referring to the environmental policy temporary storage unit 28 and of creating an improvement instruction for notifying the client 10 of the instruction if the verification result of the account lock/retry verification unit 32 corresponds to "permission of retry".

Figure 28:
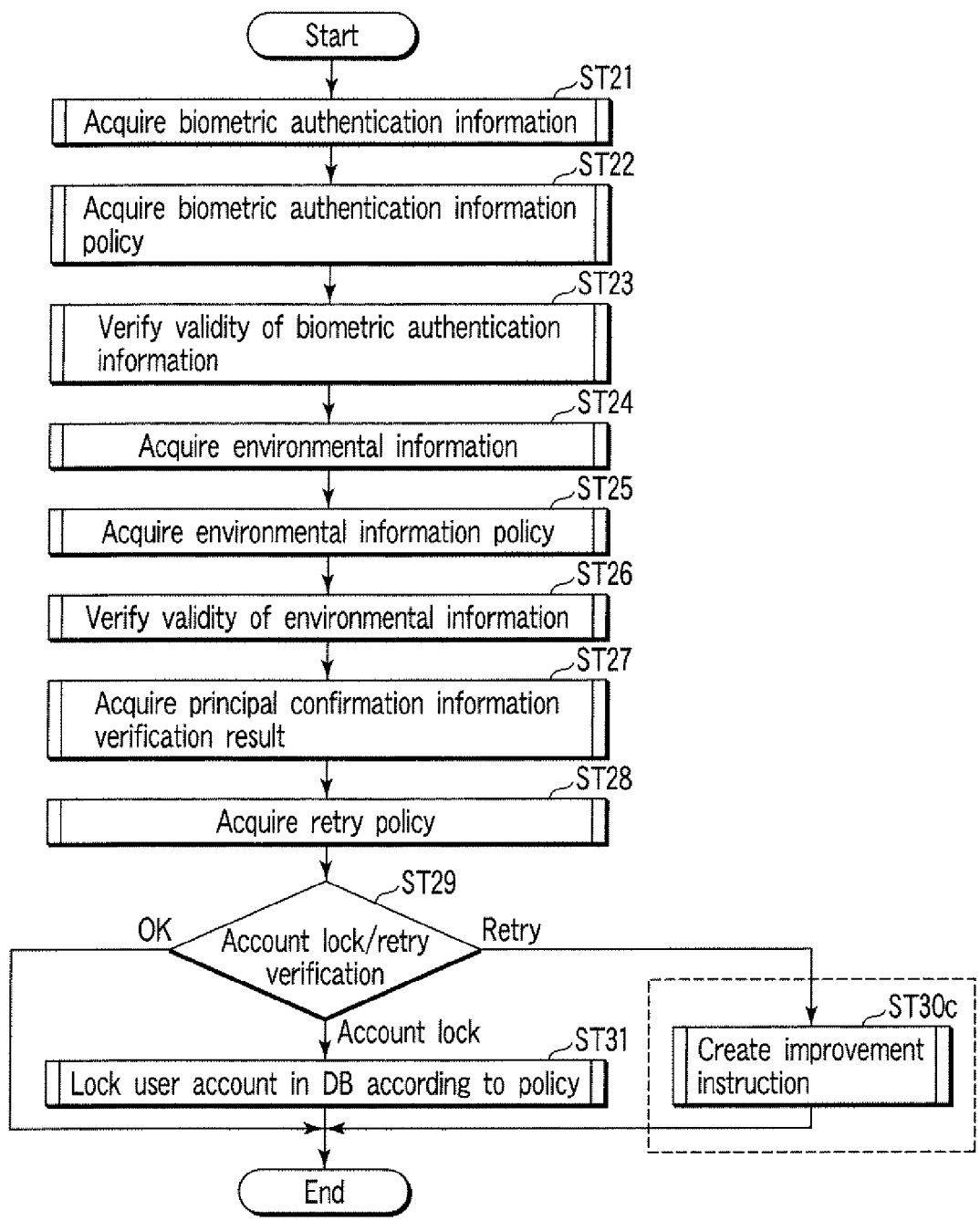
FIG. 28 is a flowchart for explaining an operation according to the fourth embodiment.

An operation performed by the biometric authentication system configured as stated above will next be described with reference to the flowcharts of FIG. 28.

(Principal Confirmation Processing)

The client 10 executes a principal confirmation processing similarly to the first embodiment, and transmits a principal confirmation processing result to the server 20.

(Verification Processing: FIG. 28)

Since processings at steps ST21 to ST29 at which account lock/retry verification is performed are similar to the first embodiment, they will not be described herein.

If the account clock/retry verification unit 32 determines that the principal confirmation information verification result corresponds to the "permission of retry", the improvement instruction creation unit 43 in the server 20 creates an improvement instruction to improve the environment information based on which the verification result is determined to correspond to the "permission of retry" (ST30c).

The improvement instruction is information for setting the environment so that, if the environmental information acquired by the client 10 does not fall within the "range of statistic data", the environmental information falls within the range. Specifically, the improvement instruction is to increase the luminance by, for example, 100 luces.

As an extreme example, the improvement instruction may be to set a sensor of a terminal, e.g., a portable telephone, including a camera function to start setting off a flash even in an environment in which the sensor does not do so. Alternatively, the improvement instruction may be to perform a biometric authentication using a different biometric authentication algorithm from a previous algorithm.

Since the processing performed at a step ST31 and the like if the verification result is determined to correspond to "account lock" is similar to that according to the first embodiment, such processing will not be described herein.

The server 20 transmits a retry request as well as the improvement instruction to the client 10. The client 10 causes the environmental information operation unit 12 to operate the environment based on the improvement instruction. Thereafter, similarly to the first embodiment, the client 10 executes the principal confirmation processing again and transmits the principal confirmation processing to the server 20. The server 20 verifies the principal confirmation processing result.

In the fourth embodiment, it is assumed that the following operation is performed. If the biological information acquisition execution unit 7 using the input/output device such as a camera is to acquire the biological information and if the sensor of the camera does not operate to set off a flash or turn on a light despite a dark surrounding environment, an operation for doing a retry is performed after the environmental information operation unit 12 makes setting off the flash or turning on the light valid.

As stated above, according to the fourth embodiment, it is possible to avoid the instance in which the setting is not changed despite the presence of a problem and the biometric authentication result is determined as NG (illegal) again at the time of the retry. This can dispense with uselessly verifying the validity of the biometric authentication result. Further, the biometric authentication system according to the fourth embodiment is available even to users who have no knowledge about problems characteristic to biometric authentication.

It is to be noted that the fourth embodiment may be applied to the second to third embodiments.

Fifth Embodiment

A biometric authentication system according to a fifth embodiment of the present invention will be described. In the fifth embodiment, the server 20 derives an environmental information policy.

A supplemental explanation will be given. In the first embodiment, the environmental information policy storage unit 28 holds the environmental information policy in advance. However, a method of defining the environmental information policy has not been described. Actually, an administrator of the server 20 needs to be familiar with the biometric authentication field and to have knowledge about the accuracy for each modality so as to prepare the environmental information policy. However, administrators of all servers 20 do not always have such knowledge. Nonetheless, such problems as the inability to maintain uniform security for various requests from the biometric authentication system occur if the environmental information policy is not correctly set.

In the fifth embodiment, the server 20 derives the environmental information policy according to matching accuracy. By doing so, even if the administrator of the server 20 is unfamiliar with the biometric authentication field, the environmental information policy that satisfies a matching accuracy that indicates an accuracy of the authentication is automatically derived by setting levels of the matching accuracy such as [High] and [Low]. It is, therefore, possible to uniformly maintain the security without the knowledge specific to the biometric authentication. This is preferable for the administrator of the server 20.

An overall configuration of the biometric authentication system according to the fifth embodiment is similar to that shown in FIG. 1.

A configuration of the client 10 is similar to that shown in FIG. 2.

As shown in FIG. 29, the principal confirmation processing verification device 23 included in the server 20 includes, as compared with the configuration shown in FIG. 7, a biometric authentication information policy storage unit 44, an evaluation scenario storage unit 45, an environmental information threshold value determination unit 46, and an environmental information verification unit 29d in place of the biometric authentication information policy storage unit 26, the environmental information policy storage unit 28, and the environmental information verification unit 29.

The biometric authentication information policy storage unit 44 is a storage device that can read information from the biometric authentication information verification unit 27 and the environmental information verification unit 29d, and stores therein a biometric authentication information policy and a modality policy. The biometric authentication information policy is information that defines a biometric authentication algorithm acceptable for the server 20 to make a principal confirmation, performance and safety of the client 10, quality of biological information, matching accuracy, and the like. As shown in FIG. 30, the modality policy is structured to be able to be referred to for each of the modality IDs arranged in order of matching accuracy. Namely, the matching accuracy of a modality that satisfies a certain modality policy can be referred to from the modality ID. Furthermore, the matching accuracy included in the biometric authentication information policy shown in FIG. 8 is set as a matching accuracy policy to be set in the modality policy, so that the modality policy enables an evaluation scenario to be referred to from the matching accuracy. Since the biometric authentication information policy storage unit 44 corresponds to various clients, it normally holds modality policies of respective modalities (e.g., a fingerprint authentication and a face authentication). Each of the modalities can be identified by, for example, "modality" in "matching method".

The evaluation scenario storage unit 45 is a storage device that can read information from the environmental information threshold value determination unit 46 and the improvement message creation unit 37, and stores therein an evaluation scenario in which an evaluation result of a biometric authentication apparatus is described as shown in FIG. 31. The evaluation scenario indicates a matching accuracy of which degree can be obtained when various pieces of information such as a manufacturer, a device name, a matching algorithm, and environmental information are set. Since the evaluation scenario storage unit 45 corresponds to various clients, it normally holds a plurality of evaluation scenarios.

The environmental information verification unit 29*d* includes the following functions (f29*d*-1) to (f29*d*-5)

(f29*d*-1): A function of acquiring information such as modality and matching algorithm of the device which has executed principal confirmation processing, from the principal confirmation processing execution device profile or the like.

(f29*d*-2): A function of acquiring information on the matching accuracy from the biometric authentication information storage unit 44.

(f29*d*-3): A function of outputting these pieces of information to the environmental information threshold value determination unit 46.

(f29*d*-4): A function of verifying whether the environmental information acquired from the principal confirmation information acquisition unit 25 is within a threshold value of the environmental information received from the environmental information threshold value determination unit 46 based on the threshold value.

(f29*d*-5): A function of outputting the verification result to the account lock/retry verification unit 32 as an environmental information verification result.

The environmental information threshold value determination unit 46 includes the following functions (f46-1) to (f46-3)

(f46-1): A function of searching for a modality used in the principal confirmation processing from the modality policies shown in FIG. 30 using the information on the principal confirmation processing execution device 4, the information on the modality, and the information on the matching accuracy acquired from the environmental information verification unit 29*d*.

(f46-2): A function of determining the threshold value of the environmental information by deriving an upper limit value and a lower limit value of measured values (1) to (N) of the environmental information in the evaluation scenario while referring to the evaluation scenario stored in the evaluation scenario storage unit 45 and corresponding to the searched modality.

(f46-3): A function of outputting the obtained threshold value of the environmental information to the environmental information verification unit 29*d*. The threshold value of the environmental information may be either the upper limit value or the lower limit value regardless of the upper limit value and the lower limit value.

Figure 32:
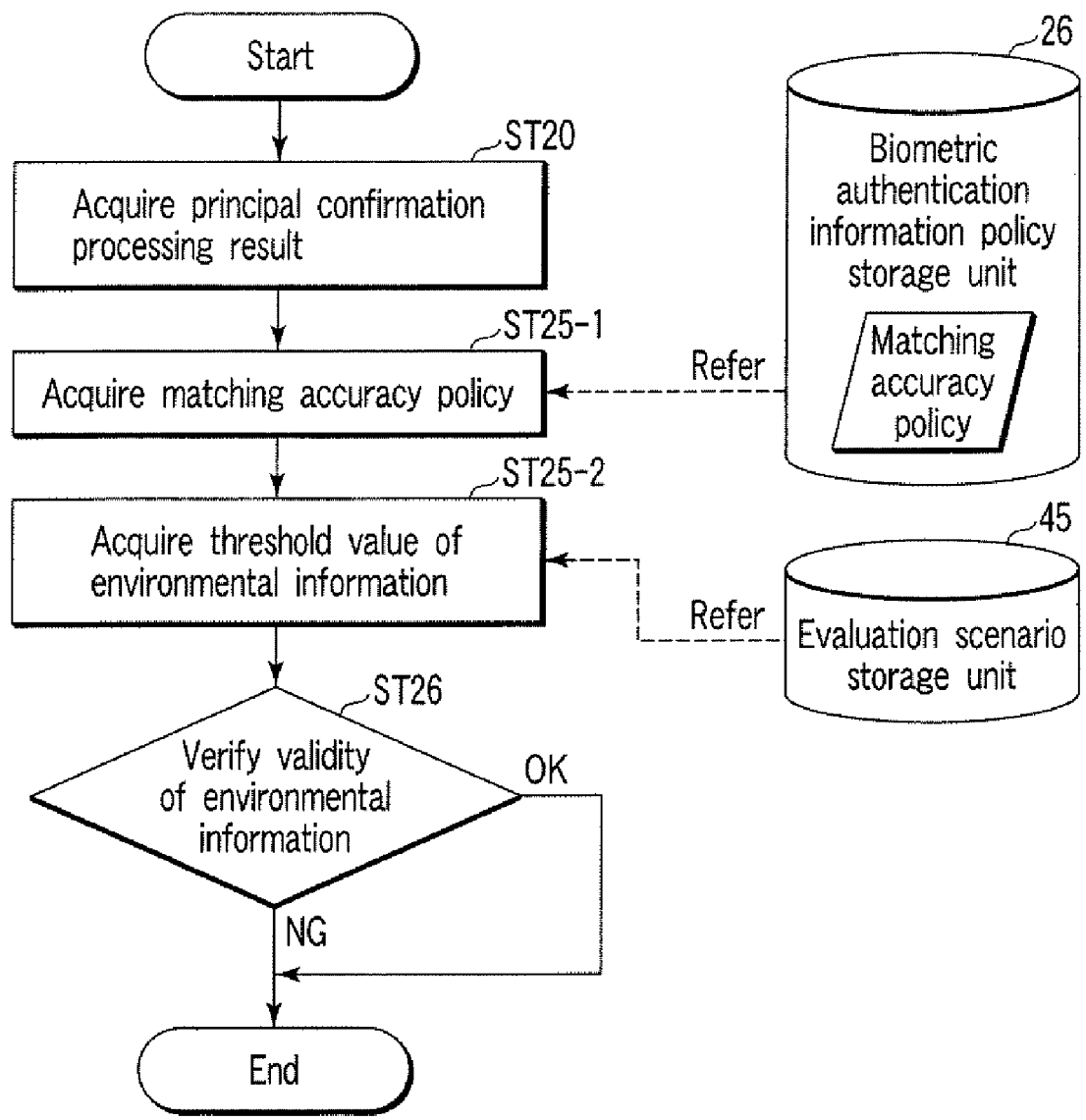
FIG. 32 is a flowchart for explaining an operation according to the fifth embodiment.

An operation performed by the biometric authentication system configured as stated above will next be described with reference to the flowchart of FIG. 32.

(Principal Confirmation Processing)

The processing up to the principal confirmation processing result that is transmitted from the client 10 to the server 20 is similar to that according to the first embodiment.

(Verification Processing: FIG. 32)

When the server 20 receives the principal confirmation processing result from the client 10 via the communication unit 21, the control unit 24 of the server 20 transmits the principal confirmation processing result to the principal confirmation information acquisition unit 25.

The principal confirmation information acquisition unit 25 extracts the biometric authentication processing execution result and the environmental information from the received principal confirmation processing result (ST20), outputs the biometric authentication processing execution result to the biometric authentication information verification unit 27 as biometric authentication information, and also outputs the principal confirmation processing execution device profile and the environmental information to the environmental information verification unit 29*d*.

The biometric authentication information verification unit 27 outputs the biometric authentication information verification result similarly to the first embodiment.

The environmental information verification unit 29*d* acquires the information such as the modality and the matching algorithm of the principal confirmation processing device 4 from the principal confirmation processing execution device profile and the like, and the information on the matching accuracy from the biometric authentication information policy storage unit 44 (ST25-l). Furthermore, the environmental information verification unit 29*d* outputs these pieces of information to the environmental information threshold value determination unit 46.

The environmental information threshold value determination unit 46 searches for the matching accuracy policy from the modality policy shown in FIG. 30 using the acquired information on the principal confirmation processing execution device 4 and on the matching accuracy. While referring to the evaluation scenario corresponding to the matching accuracy policy and shown in FIG. 31, the environmental information threshold value determination unit 46 derives the upper limit value and the lower limit value of measured values (1) to (N) of the environmental information in the evaluation scenario. The environmental information threshold value determination unit 46 decides the threshold value of the environmental information as shown in FIG. 9 based on the upper limit value and the lower limit value (ST25-2). As the measured values (1) to (N) of the environmental information, values included in the principal confirmation processing result and corresponding to the environmental information are used.

Thereafter, the environmental information threshold value determination unit 46 outputs the obtained threshold value of the environmental information to the environmental information verification unit 29*d*.

When receiving the threshold value of the environmental information, the environmental information verification unit 29*d* verifies whether the environmental information acquired from the principal confirmation processing result is within the threshold value (ST26). Further, the environmental information verification unit 29*d* outputs the verification result to the account lock/retry verification unit 32 as the environmental information verification result.

The account lock/retry verification unit 32 determines whether to lock the account of the user, to request a retry or to provide services, similarly to the first embodiment.

Since the determination of the account lock/retry verification unit 32 is similar to that according to the first embodiment except for a processing for transmitting a retry request and creating an improvement message, it will not be described herein.

If the retry request is to be transmitted, the improvement message creation unit 37 can predict which environmental information on the client 10 to which degree is to be corrected so as to obtain the requested authentication accuracy based on the principal confirmation information verification result, the environmental information verification result, and the evaluation scenario. Therefore, the improvement message creation unit 37 creates an improvement message in which the environmental information to be improved is reflected.

Finally, the control unit 24 that has received the verification result from the account lock/retry verification unit 32 transmits a request to provide services to the service providing device 22 if the verification result is OK.

If the verification result is NG, the control unit 24 transmits a notification of the NG to the client 10 via the communication unit 21. At this time, if the control unit 24 receives the improvement message and the retry request from the improvement message creation unit 37, the control unit 24 transmits the improvement message and the retry request to the client 10.

As stated above, according to the fifth embodiment, only if the administrator sets the matching accuracy is it possible to dynamically derive the environmental information based on the evaluation scenario. Therefore, even an administrator without knowledge specific to biometrics can constitute the verification device that satisfies security requirements.

Alternatively, the device dynamically deriving the environmental information based on the evaluation scenario according to the fifth embodiment may be arranged in the client 10. In this alternative, if the client 10 is to perform the principal confirmation processing, it is possible to determine whether the present environmental information is appropriate and, if inappropriate, it is possible to determine how to correct the environmental information.

By arranging this device in the client 10, it is possible to prevent an instance in which the verification result becomes NG (illegal) again due to inappropriate environmental information when the client 10 does a retry using the inappropriate environmental information. Accordingly, it is possible to dispense with transmission of a useless principal confirmation processing result.

It is thereby possible to lessen the load on the server 20 and to reduce the labor of the user using the client 10.

Moreover, according to the fifth embodiment, the threshold value of the environmental information is derived based on the evaluation scenario held by the server 20. However, the present invention is not limited to this. Alternatively, the server 20 need not hold the evaluation scenario, and the evaluation scenario or evaluation information corresponding to the evaluation scenario may be designated in the principal confirmation processing execution device profile, the device certificate or the like included in the principal confirmation processing result received from the client 10 using URI. In this case, the threshold value may be derived based on the evaluation scenario or the evaluation information referred to by the URI.

Sixth Embodiment

A biometric authentication system according to a sixth embodiment of the present invention will be described. In the sixth embodiment, which is related to the fifth embodiment, if a plurality of biometric authentication apparatuses are connected to the client 10 and a first principal confirmation processing fails, a server administrator makes a notification so as to use a biometric authentication apparatus having a higher accuracy among the biometric authentication apparatuses connected to the client 10. The sixth embodiment is preferable for both users and the server administrator since it is possible to perform more accurate principal confirmation processing.

Figure 33:
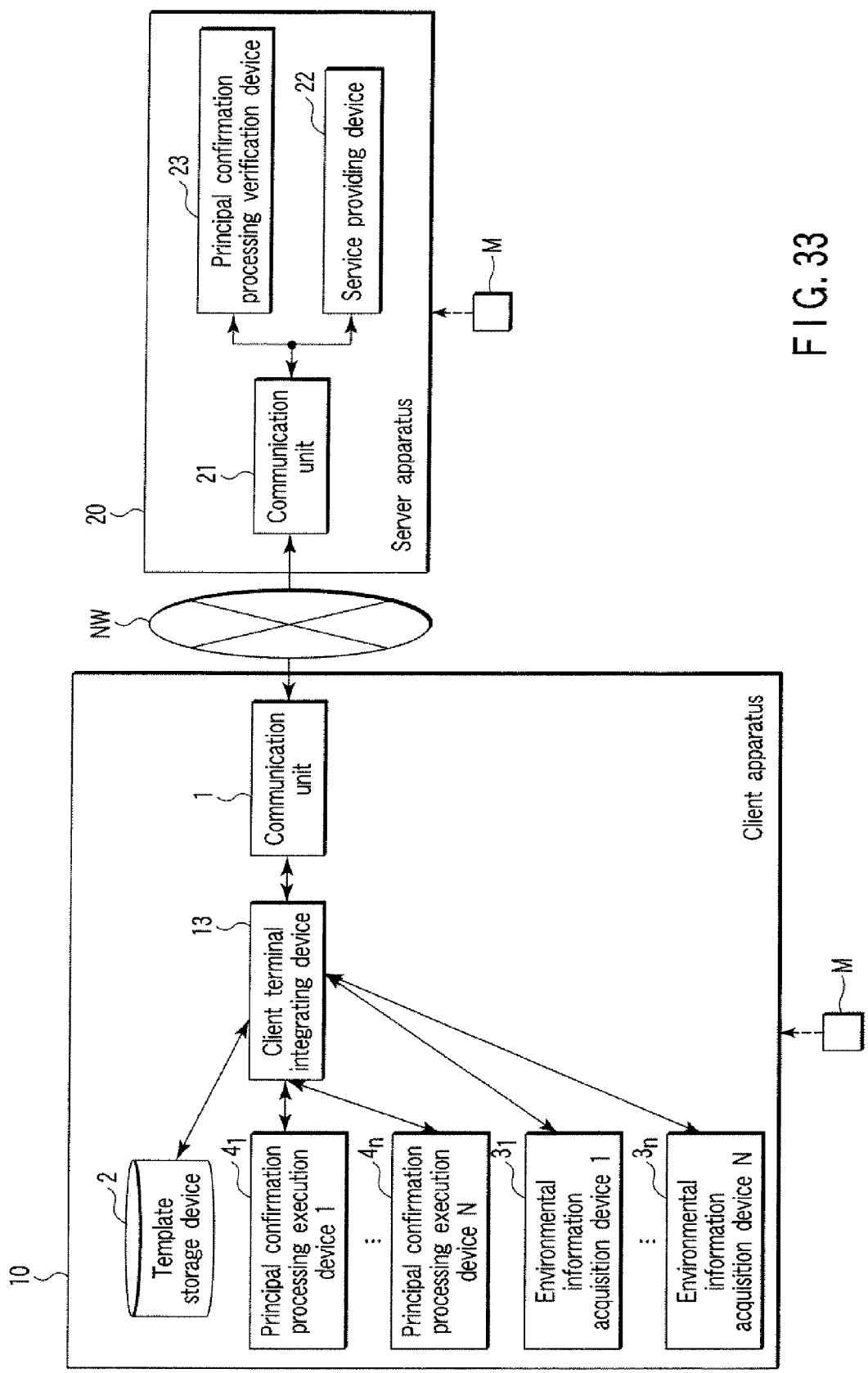
FIG. 33 is a pattern diagram showing an overall configuration of a biometric authentication system according to a sixth embodiment of the present invention.

An overall configuration of the biometric authentication system according to the sixth embodiment is shown in FIG. 33. The client 10 of the biometric authentication system is configured so that a client terminal integrating device 13 is connected between the communication unit 1 and the template storage device 2, and that n principal confirmation processing execution devices $4_1$ to $4_n$ and n environmental information acquisition devices $3_1$ to $3_n$ are connected to the client terminal integrating device 13.

The client terminal integrating device 13 is a device that mediates communication among the template storage device 2, the environmental information acquisition devices $3_1$ to $3_n$, the principal confirmation processing execution devices $4_1$ to $4_n$, and the server 20.

Figure 34:
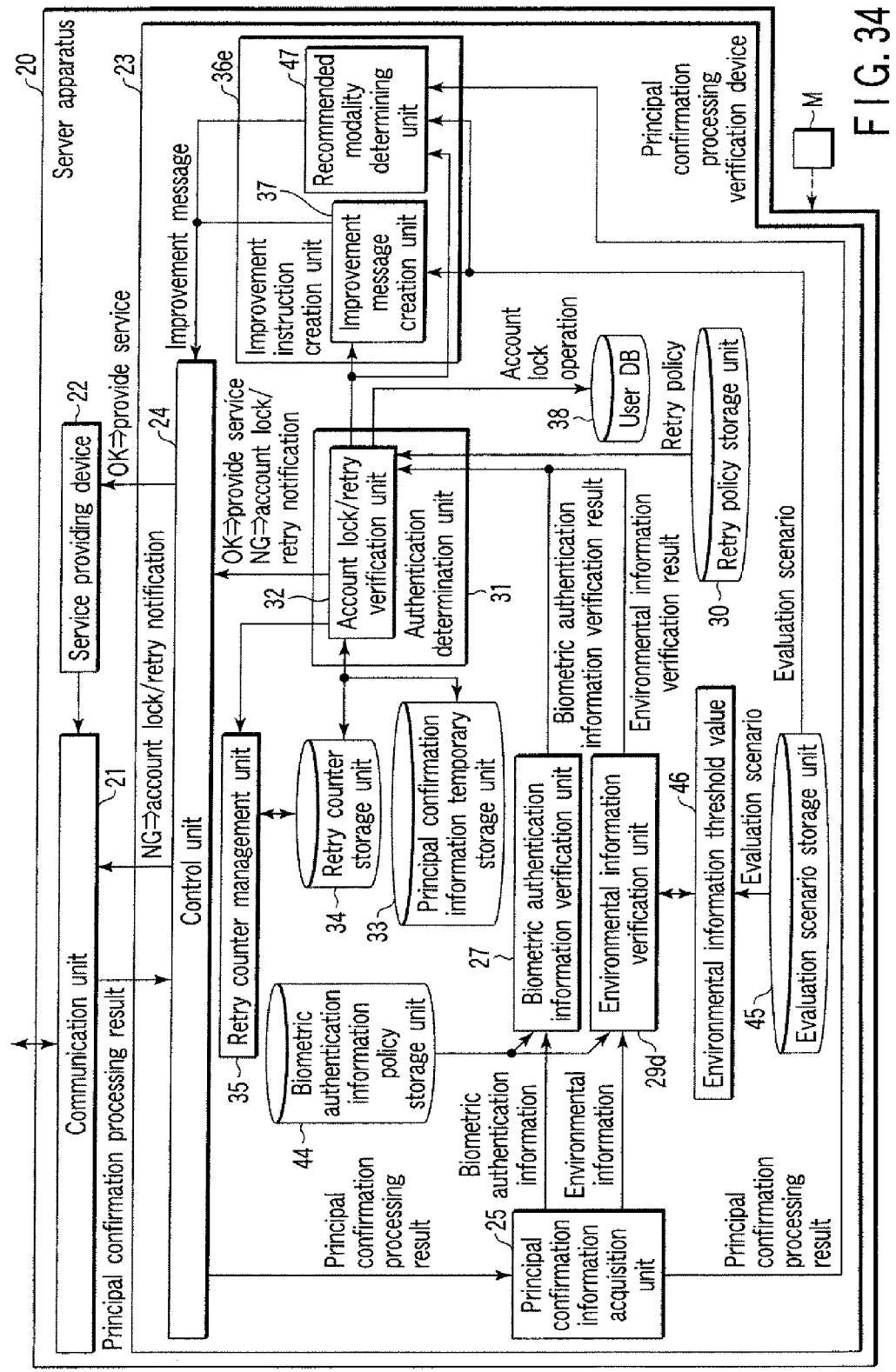
FIG. 34 is a pattern diagram showing a configuration of a server apparatus according to the sixth embodiment.

As shown in FIG. 34, in the principal confirmation information verification device 23 included in the server 20, the improvement instruction creation unit 36 shown in FIG. 29 is replaced by an improvement instruction creation unit 36e that additionally includes a recommended modality determination unit 47.

The recommended modality determination unit 47 includes a function of deciding a recommended modality while referring to an evaluation scenario stored in the evaluation scenario storage unit 45 using modality information obtained from the principal confirmation processing result and environmental information, and a function of outputting the decided recommended modality to the improvement message creation unit 37.

An operation performed by the biometric authentication system configured as stated above will be described with reference to the flowchart of FIG. 35.

(Principal Confirmation Processing)

Similarly to the fifth embodiment, if the user wants to access the server 20 and enjoy services, the client 10 transmits an authentication request to the server 20 based on the user's operation. When receiving the authentication request, the server 20 transmits a processing creation request to the client 10.

Similarly to the fifth embodiment, when the client 10 receives the processing creation request, the client terminal integrating device 13 obtains a principal confirmation processing result using the principal confirmation processing execution device $4_i$ (where $1 \leq i \leq n$) selected by the user. In addition, the client terminal integrating device 13 obtains principal confirmation processing execution device profiles stored in the principal confirmation processing execution-device profile storage units 8 of the respective n principal confirmation processing execution devices $4_1$ to $4_n$ from the n principal confirmation processing execution devices $4_1$ to $4_n$.

The client 10 integrates the principal confirmation processing result and the n principal confirmation processing execution device profiles into a principal confirmation processing result, and transmits the resultant principal confirmation processing result to the server 20.

(Verification Processing)

The server 20 verifies the validity of the principal confirmation processing result similarly to the fifth embodiment. Since the processing from steps S21 to S29 is similar to that according to the fifth embodiment, it will not be described herein.

If a retry request is to be transmitted, the recommended modality determination unit 47 decides on a recommended modality using the environmental information included in the principal confirmation processing result as follows (ST30-1 to ST30-5).

Figure 35:
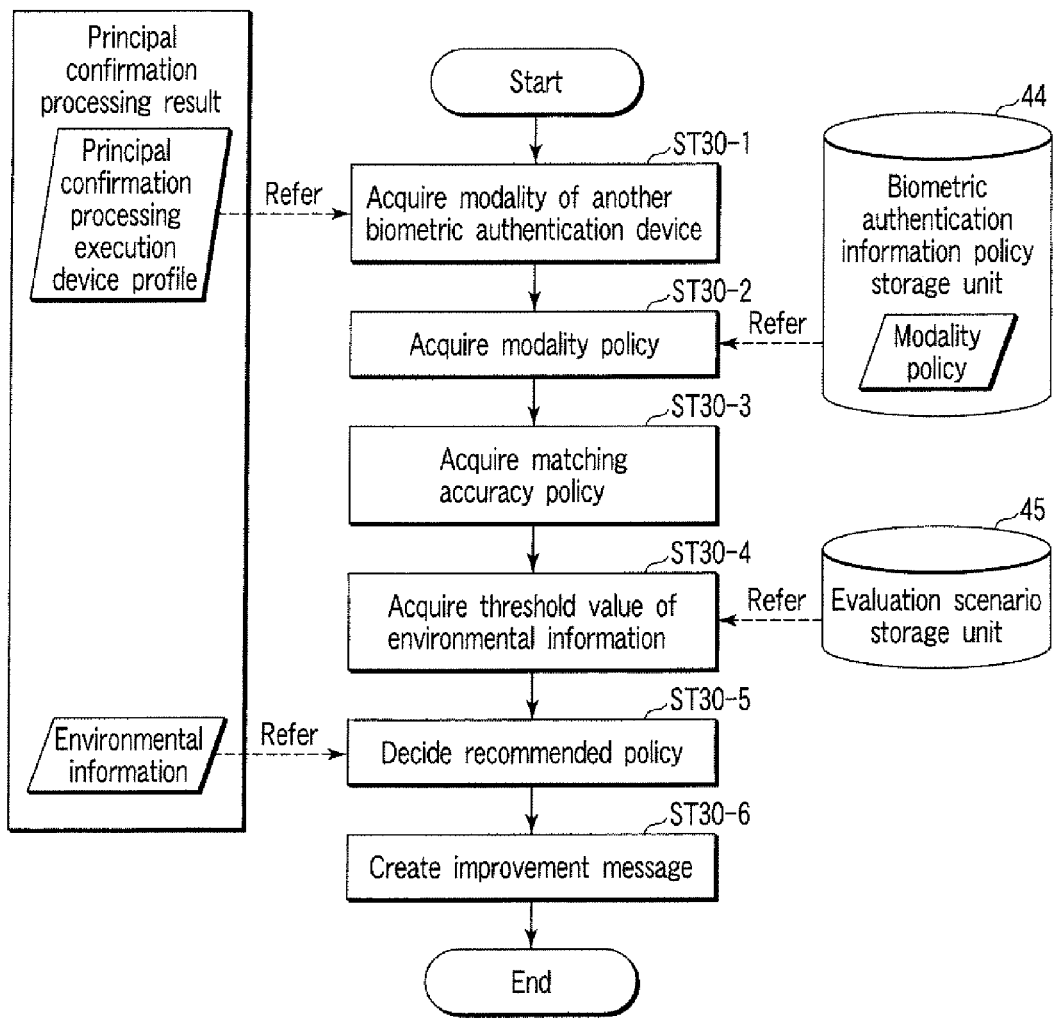
FIG. 35 is a flowchart for explaining an operation according to the sixth embodiment.

As shown in FIG. 35, the recommended modality determination unit 47 first acquires another principal confirmation processing execution device profile included in the principal confirmation processing result (ST30-1).

Next, the recommended modality determination unit 47 acquires a modality policy for determining the matching accuracy from the biometric authentication information policy storage unit 44 (ST30-2).

Then, the recommended modality determination unit 47 acquires a matching accuracy policy from a modality policy of a modality coincident with that in another principal confirmation processing device profile (ST30-3), and acquires an evaluation scenario corresponding to the matching accuracy policy.

The recommended modality determining unit 47 acquires the threshold value of the environmental information from the acquired evaluation scenario (ST30-4), and selects the evaluation scenario for which the environmental information included in the principal confirmation processing result satisfies the threshold value of the environmental information included in the evaluation scenario. The recommended modality determining unit 47 decides on the modality of the evaluation scenario as a recommended modality (ST30-5). The recommended modality determining unit 47 transmits the determined recommended modality to the improvement message creation unit 37.

The improvement message creation unit 37 creates an improvement message so as to use the recommended modality (ST30-6). It is assumed, for example, that the user owns two biometric authentication apparatuses and that modalities of the respective biometric authentication apparatuses are a face authentication and a finger authentication, respectively. In the first principal confirmation processing, the face authentication is selected as the modalities of the biometric authentication apparatuses. If the user's face does not satisfy environmental information verification conditions since a photographic location of the face is dark, the improvement message creation unit 37 creates the following improvement message. "Because of the dark room, a recognizable face image could not be created. The biometric authentication apparatus recommended in the current environment is the fingerprint authentication apparatus. Please try authentication once more using the fingerprint authentication apparatus".

This improvement message is transmitted from the server 20 to the client 10, thereby notifying the user of the client 10 of the recommended modality. The user retries a biometric authentication according to the recommended modality, accordingly.

As stated above, according to the sixth embodiment, if a plurality of biometric authentication apparatuses are connected to the client terminal, the user is notified to use the biometric authentication apparatus optimum in the current environment at the time of the retry request after the first principal confirmation processing fails. It is, therefore, possible to dispense with unnecessary processings.

Seventh Embodiment

A biometric authentication system according to a seventh embodiment of the present invention will be described. The biometric authentication system according to the seventh embodiment is configured, as compared with that according to the sixth embodiment, to notify the user of the optimum biometric authentication apparatus not at the time of a retry but before the principal confirmation processing.

In the seventh embodiment, the biometric authentication can be executed using the optimum biometric authentication apparatus from the beginning. The seventh embodiment is more preferable for both the user and the server 20 since the possibility of retry is reduced and it is unnecessary for the server 20 to perform a plurality of verifications. Furthermore, since the account lock/retry verification unit 32 is not employed in the server 20 in the seventh embodiment unlike the sixth embodiment, the server 20 need not include the account lock/retry verification unit 32.

An overall configuration of the biometric authentication system according to the seventh embodiment is entirely identical to that according to the sixth embodiment.

The client 10 is similar in configuration to that according to the sixth embodiment except for the following respect. The client terminal integrating device 13 according to the seventh embodiment includes a function of transmitting an authentication request that includes the environmental information acquired from the environmental information acquisition devices $3_1$ to $3_n$ in advance and the principal confirmation processing execution device profiles acquired from the principal confirmation processing execution devices $4_1$ to $4_n$ to the server 20 before the biometric authentication.

The server 20 is similar in configuration to that according to the sixth embodiment except for the following respects. The recommended modality determining unit 47 included in the server 20 includes a function of deciding on a recommended modality based on the principal confirmation processing execution device profile and the environmental information included in the authentication request received before the biometric authentication, The improvement instruction creation unit 36e includes a function of creating a message indicating which biometric authentication apparatus is to be used for designating a biometric authentication apparatus to be used based on the recommended modality determined by the recommended modality determining unit 47. The communication unit 21 includes a function of transmitting the message indicating which biometric authentication apparatus is to be used created by the improvement instruction creation unit 36e to the client 10.

An operation performed by the biometric authentication system configured as stated above will be described.

Similarly to the sixth embodiment, if the user wants to access the server 20 and enjoy services, the client 10 receives a user's desire by a method not shown. The client terminal integrating device 13 acquires the environmental information from the environmental information acquisition devices $3_1$ to $3_n$ and also acquires the principal confirmation processing execution device profiles from the principal confirmation processing execution device-profile storage units 8 in the respective principal confirmation processing execution devices $4_1$ to $4_n$. Thereafter, the client terminal integrating device 13 transmits an authentication request using the environmental information and the principal confirmation processing execution device profiles.

The server 20 extracts the principal confirmation processing execution device profile and the environmental information included in the authentication request, and determines a recommended modality by performing the same processing as that performed by the recommended modality determination unit 47 according to the sixth embodiment. Namely, as shown in FIG. 36, the processing for determining the recommended modality is similar to that from the steps ST30-1 to ST30-5 described in FIG. 35 except that the processing is executed before the biometric authentication.

The server 20 creates the message indicating which biometric authentication apparatus is to be used for designating the biometric authentication apparatus to be used based on the determined recommended modality (ST20e-6).

It is assumed, for example, the user owns two biometric authentication apparatuses and modalities of the biometric authentication apparatuses are the face authentication and the fingerprint authentication, respectively. A measured luminance as the environmental information is very low and a humidity as the environmental information is optimum for the fingerprint authentication. Therefore, if the face authentication is selected as the modality of the biometric authentication apparatus, it is estimated that the lower-accuracy face authentication is performed due to low luminance. However, if the fingerprint authentication is performed, it can be estimated that the higher-accuracy fingerprint authentication is performed due to optimum humidity.

In this case, the following message indicating which biometric authentication apparatus is to be used is created. "The biometric authentication apparatus recommended in the current environment is the fingerprint authentication apparatus. Please use the fingerprint authentication apparatus at the time of the principal confirmation". It is to be noted that the processing for creating the message indicating which biometric authentication apparatus is to be used is similar to the processing for creating the improvement message except that the processing is executed before the biometric authentication.

The server 20 transmits the message indicating which biometric authentication apparatus is to be used to the client 10. The client 10 performs the principal confirmation processing using the designated biometric authentication apparatus (=one of the principal confirmation processing execution devices $4_1$ to $4_n$) (ST11 to ST17).

Since the processing from subsequent steps ST21 to ST31 is similar to that according to, for example, the sixth embodiment, it will not be described herein.

As stated above, according to the seventh embodiment, the user uses the biometric authentication apparatus based on the message indicating which biometric authentication apparatus is to be used, whereby it is possible to avoid executing the biometric authentication in which the principal confirmation fails due to the environmental information before execution.

The technique described above for the embodiment can be stored as a program to be executed by a computer in memory mediums including magnetic disks (floppy™ disks, hard disks, etc.), optical disks (CD-ROMs, DVDs, etc.), magneto-optical disks (MOs) and semiconductor memories for distribution.

Memory mediums that can be used for the purpose of the present invention are not limited to those listed above and memory mediums of any type can also be used for the purpose of the present invention so long as they are computer-readable ones.

Additionally, the OS (operating system) operating on a computer according to the instructions of a program installed in the computer from a memory medium, data base management software and/or middleware such as network software may take part in each of the processes for realizing the above embodiment.

Still additionally, memory mediums that can be used for the purpose of the present invention are not limited to those independent from computers but include memory mediums adapted to download a program transmitted by LANs and/or the Internet and permanently or temporarily store it.

It is not necessary that a single memory medium is used with the above described embodiment. In other words, a plurality of memory mediums may be used with the above-described embodiment to execute any of the above described various processes. Such memory mediums may have any configuration.

For the purpose of the present invention, a computer executes various processes according to one or more than one programs stored in the memory medium or mediums as described above for the preferred embodiment. More specifically, the computer may be a stand alone computer or a system realized by connecting a plurality of computers by way of a network.

For the purpose of the present invention, computers include not only personal computers but also processors and microcomputers contained in information processing apparatus. In other words, computers generally refer to apparatus and appliances that can realize the functional features of the present invention by means of a computer program.

The present invention is by no means limited to the above described embodiment, which may be modified in various different ways without departing from the spirit and scope of the invention. Additionally, any of the components of the above described embodiment may be combined differently in various appropriate ways for the purpose of the present invention. For example, some of the components of the above described embodiment may be omitted. Alternatively, components of different embodiments may be combined appropriately in various different ways for the purpose of the present invention.

What is claimed is:

1. A biometric authentication system comprising:
   a client apparatus which executes a biometric authentication and transmits obtained biometric authentication information; and
   a server apparatus which verifies the validity of the biometric authentication information received from the client apparatus based on a predetermined biometric authentication policy,
   wherein the client apparatus includes:
      an environmental information acquisition device configured to acquire environmental information by measuring an environment during execution of the biometric authentication, the environmental information including at least one of a luminance information, a humidity information, and a biological detection information; and
      a device configured to transmit the environmental information as well as the biometric authentication information to the server apparatus, and
   wherein the server apparatus includes:
      an environmental information policy storage device having stored, in advance, an environmental information policy indicating a condition to be satisfied by the environmental information during the biometric authentication;
      a retry policy storage device having stored, in advance, retry policy information in which information indicating that a "biometric authentication information verification result is legal or illegal", information indicating that an "environmental information verification result is illegal", and information indicating "permission of retry" are made to correspond to one another;
      an account lock storage device having stored, in advance, account lock information in which information indicating that a "biometric authentication information verification result is illegal", information indicating that an "environmental information verification result is illegal", information indicating "past retry count is equal to or greater than predetermined number", and information indicating "a strength of an account lock" are made to correspond to one another;
      a principal confirmation information temporary storage device configured to store a determination result of a determination device for a preset certain period as a past principal confirmation information;
      a retry counter storage device configured to store a retry count for every user;
      a user database device configured to store accounts of all users registered in advance as well as an account lock flag and unlocking time, the account lock flag indicating an account lock state;

an environmental information verification device configured to verify the validity of the environmental information received from the client apparatus based on the environmental information policy;

the determination device configured to determine whether the biometric authentication information verification result using the biometric authentication policy and the environmental information verification result using the environmental information verification device correspond to a principal confirmation success or a principal confirmation failure based on the retry policy information, the account lock information and the past principal confirmation information, the principal confirmation failure indicating the "permission of the retry" or "account lock";

a device configured to return an improvement message related to the environmental information to the client apparatus if the determination device determines that the biometric authentication information verification result using the biometric authentication policy and the environmental information verification result using the environmental information verification device correspond to the "permission of the retry" as the principal confirmation failure;

a retry counter management device configured to increment the retry counter if the determination device determines that the biometric authentication information verification result using the biometric authentication policy and the environmental information verification result using the environmental information verification device correspond to the "permission of the retry" as the principal confirmation failure; and an account lock device configured to lock the account of the user stored in the user database device on the basis of the "strength of the account lock" of the account lock information if the determination device determines that the biometric authentication information verification result using the biometric authentication policy and the environmental information verification result using the environmental information verification device correspond to the "account lock" as the principal confirmation failure.

2. A server apparatus communicable with a client apparatus which executes a biometric authentication and transmits obtained biometric authentication information, and verifying the validity of the biometric authentication information received from the client apparatus based on a predetermined biometric authentication policy, the server apparatus comprising:

an environmental information policy storage device having stored, in advance, an environmental information policy indicating a condition to be satisfied by the environmental information during the biometric authentication;

a retry policy storage device having stored, in advance, retry policy information in which information indicating that a "biometric authentication information verification result is legal or illegal", information indicating that an "environmental information verification result is illegal", and information indicating "permission of retry" are made to correspond to one another;

an account lock storage device having stored, in advance, account lock information in which information indicating that a "biometric authentication information verification result is illegal", information indicating that an "environmental information verification result is illegal", information indicating "past retry count is equal to or greater than predetermined number", and information indicating "a strength of an account lock" are made to correspond to one another;

a principal confirmation information temporary storage device configured to store a determination result of a determination device for a preset certain period as a past principal confirmation information;

a retry counter storage device configured to store a retry count for every user;

a user database device configured to store accounts of all users registered in advance as well as an account lock flag and unlocking time, the account lock flag indicating an account lock state;

an environmental information verification device configured to verify the validity of the environmental information received based on the environmental information policy when the server apparatus receives "the environmental information during execution of the biometric authentication, the environmental information including at least one of a luminance information, a humidity information, and a biological detection information" and the "biometric authentication information" from the client apparatus;

the determination device configured to determine whether the biometric authentication information verification result using the biometric authentication policy and the environmental information verification result using the environmental information verification device correspond to a principal confirmation success or a principal confirmation failure based on the retry policy information, the account lock information and the past principal confirmation information, the principal confirmation failure indicating the "permission of the retry" or "account lock";

a device configured to return an improvement message related to the environmental information to the client apparatus if the determination device determines that the biometric authentication information verification result using the biometric authentication policy and the environmental information verification result using the environmental information verification device correspond to the "permission of the retry" as the principal confirmation failure;

a retry counter management device configured to increment the retry counter if the determination device determines that the biometric authentication information verification result using the biometric authentication policy and the environmental information verification result using the environmental information verification device correspond to the "permission of the retry" as the principal confirmation failure; and an account lock device configured to lock the account of the user stored in the user database device on the basis of the "strength of the account lock" of the account lock information if the determination device determines that the biometric authentication information verification result using the biometric authentication policy and the environmental information verification result using the environmental information verification device correspond to the "account lock" as the principal confirmation failure.

3. A computer program stored in a non-transitory computer-readable storage medium used by a server apparatus communicable with a client apparatus which executes a biometric authentication and transmits obtained biometric authentication information, and verifying the validity of the biometric authentication information received from the client apparatus based on a predetermined biometric authentication policy, the program comprising:

a first program code, when executed by a processor, causing a computer of the server apparatus to execute a processing for writing, in advance, an environmental information policy indicating a condition to be satisfied by the environmental information during the biometric authentication in a storage device of the computer of the server apparatus;

a second program code, when executed by the processor, causing the computer to execute a processing for writing, in advance, retry policy information in which information indicating that a "biometric authentication information verification result is legal or illegal", information indicating that an "environmental information verification result is illegal", and information indicating "permission of retry" are made to correspond to one another, in a storage device of the computer;

a third program code, when executed by the processor, causing the computer to execute a processing for writing, in advance, account lock information in which information indicating that a "biometric authentication information verification result is illegal", information indicating that an "environmental information verification result is illegal", information indicating "past retry count is equal to or greater than predetermined number", and information indicating "a strength of an account lock" are made to correspond to one another, in a storage device of the computer;

a fourth program code, when executed by the processor, causing the computer to execute a processing for storing a determination result of a determination processing for a preset certain period as a past principal confirmation information, in a storage device of the computer;

a fifth program code, when executed by the processor, causing the computer to execute a processing for writing, a retry count for every user, in a storage device of the computer;

a sixth program code, when executed by the processor, causing the computer to execute a processing for writing, accounts of all users registered in advance as well as an account lock flag and unlocking time, the account lock flag indicating an account lock state, in a storage device of the computer;

a seventh program code, when executed by the processor, causing the computer to execute an environmental information verification processing for verifying the validity of the environmental information received based on the environmental information policy when the server apparatus receives "the environmental information during execution of the biometric authentication, the environmental information including at least one of a luminance information, a humidity information, and a biological detection information" and the "biometric authentication information" from the client apparatus;

an eighth program code, when executed by the processor, causing the computer to execute a determination processing for determining whether the verification result of the biometric authentication information using the biometric authentication policy and the verification result of the environmental information using the environmental information verification processing correspond to a principal confirmation success or a principal confirmation failure based on the retry policy information, the account lock information and the past principal confirmation information, the principal confirmation failure indicating the "permission of the retry" or "account lock";

a ninth program code, when executed by the processor, causing the computer to execute a processing for returning an improvement message related to the environmental information to the client apparatus if it is determined that the verification result of the biometric authentication information using the biometric authentication policy and the verification result of the environmental information using the environmental information verification processing correspond to the "permission of the retry" as the principal confirmation failure;

a tenth program code, when executed by the processor, causing the computer to execute a processing for incrementing the retry counter if the determination processing determines that the biometric authentication information verification result using the biometric authentication policy and the environmental information verification result using the environmental information verification processing correspond to the "permission of the retry" as the principal confirmation failure; and an eleventh program code, when executed by the processor, causing the computer to execute a processing for locking the account of the user stored in the storage device on the basis of the "strength of the account lock" of the account lock information if the determination processing determines that the biometric authentication information verification result using the biometric authentication policy and the environmental information verification result using the environmental information verification processing correspond to the "account lock" as the principal confirmation failure.

* * * * *